March 29, 1927. 1,622,553
F. L. O. WADSWORTH
VEHICLE SHOCK ABSORBER
Filed June 16, 1920    3 Sheets-Sheet 1
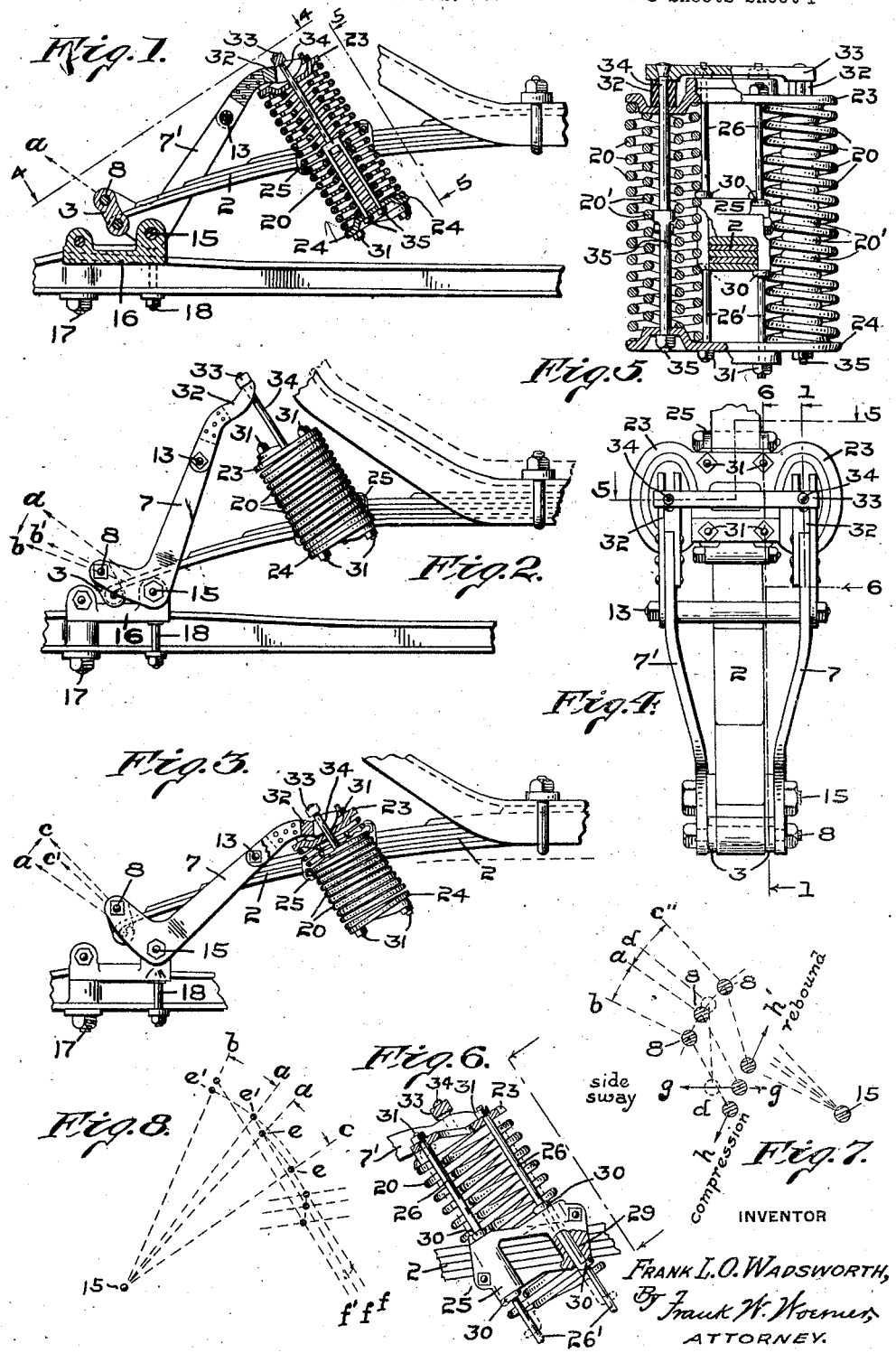

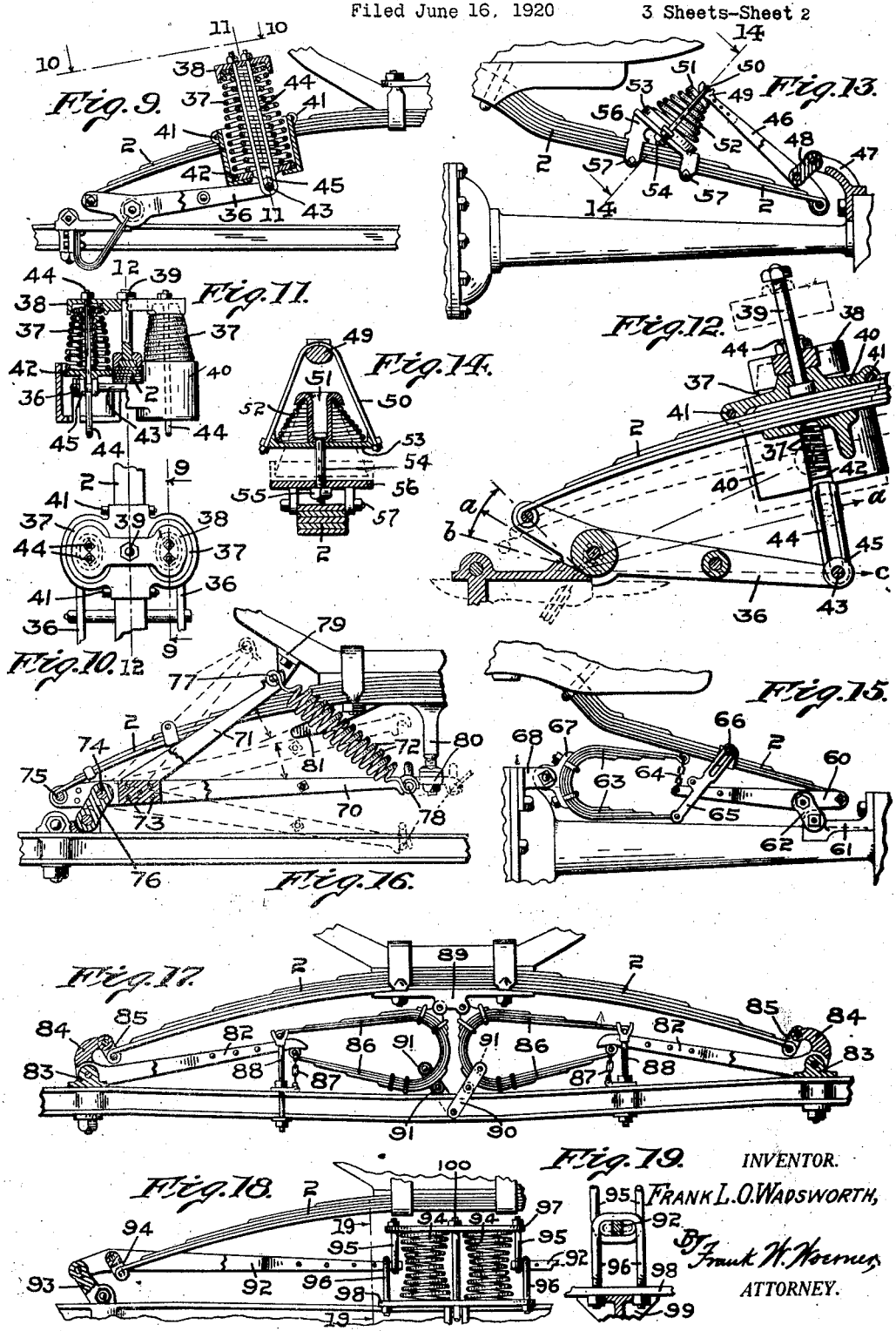

March 29, 1927.
F. L. O. WADSWORTH
1,622,553
VEHICLE SHOCK ABSORBER
Filed June 16, 1920
3 Sheets-Sheet 3
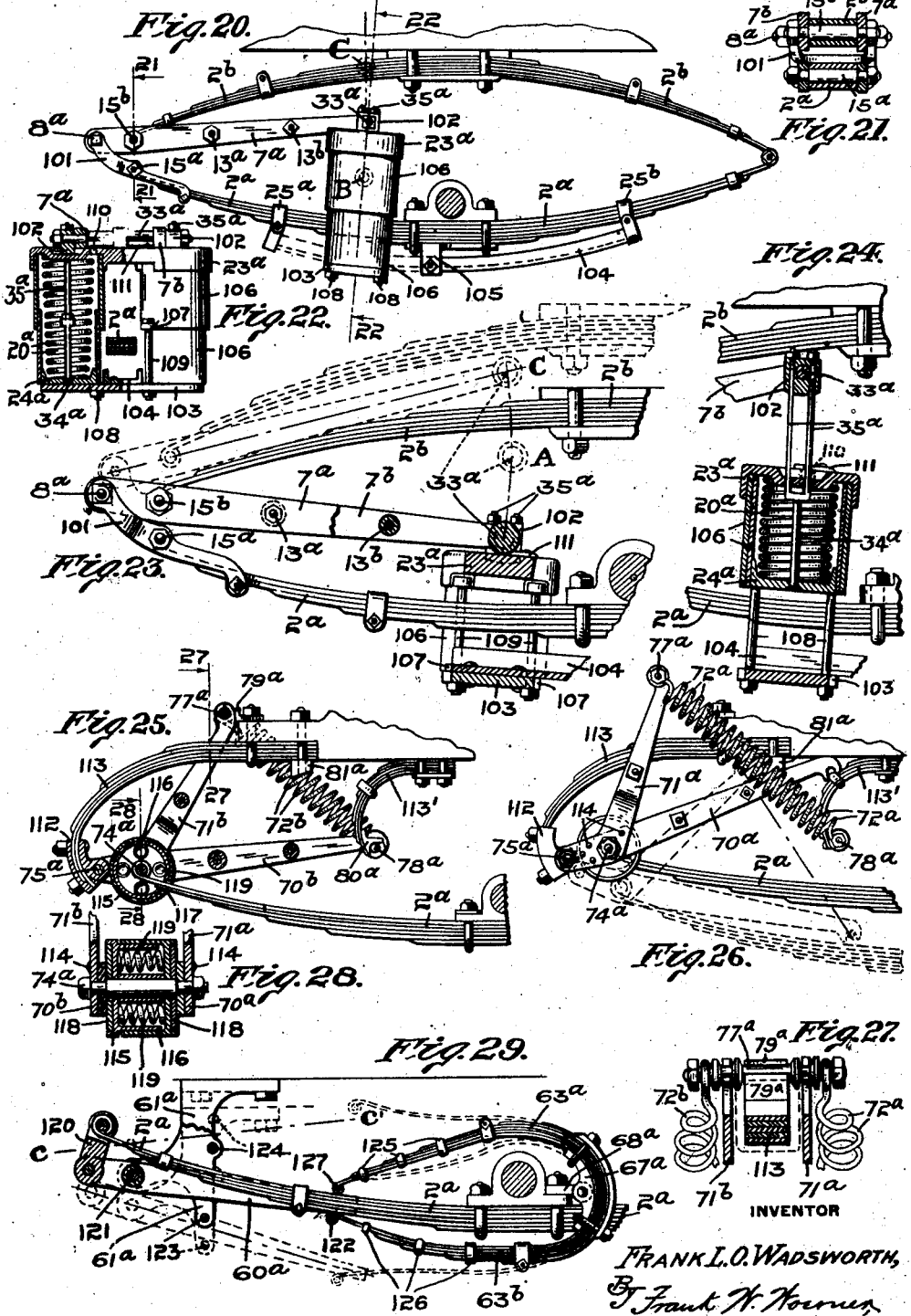
INVENTOR
FRANK L.O. WADSWORTH,
By Frank W. Horner,
ATTORNEY.

Patented Mar. 29, 1927.

1,622,553

UNITED STATES PATENT OFFICE.

FRANK L. O. WADSWORTH, OF PITTSBURGH, PENNSYLVANIA.

VEHICLE SHOCK ABSORBER.

Application filed June 16, 1920. Serial No. 389,337.

My invention relates to that species of vehicle shock absorber construction, which is generally designated as a lever-actuated-supplemental-spring suspension system (or more briefly as an L. A. S. shock absorber), and which comprises a main leaf spring, of either the side leaf or the cross-leaf suspension type, a lever element interposed between some part of the main spring and that member of the vehicle to which said part is ordinarily attached, and an auxiliary or secondary spring operatively connected to the lever element, and actuated or flexed by the concurrent or cooperative movements of the main spring and lever when the suspended parts approach, or separate from, each other; and my present improvements are particularly adapted to use in connection with these, and allied forms of elastic suspension organizations.

In its generic aspect this invention has for one of its primary objects the provision of a dual system of connections between the actuating lever element and the auxiliary spring, whereby the latter is always positively flexed, or similarly tensioned, whenever the main spring and the lever move in either direction from the position of static equilibrium, and is thereby utilized to elastically resist and restrain both the closing and the opening movements of the spring supported parts, and thus cushion and absorb, not only the kinetic compressive shocks, but also the reverse or reciprocal rebound or recoil stresses. This double use of a single supplemental spring element is very beneficial in securing a high degree of sensitiveness and efficiency in the action of the spring suspension system as a whole; and greatly increases its possible range of action under wide variations in load and road conditions.

Another general object of my improvements is to provide a construction in which the actuating lever element—and the part of the supplemental spring operatively associated therewith through one or the other of the dual connection members of the combination—is positively moved in a direction opposite to that in which the chassis support for the supplemental spring is concurrently moved; so that the resultant positive flexure of the secondary resilient element is produced in part by the movement of the actuating lever and in part by the opposite movement of the said chassis support; and both the approach and the separation of the relatively movable body members are elastically resisted and checked, not only by the progressive tensioning of the supplemental spring, but also by the reaction of this tensioned element against its reversely moving seat. This feature of my improvements is of advantage in multiplying, or increasing, the supplemental spring flexure that is produced by a given displacement of the parts from the normal load position of static equilibrium; and is also of advantage in securing a more direct and positive check on any such displacement.

Another feature of my invention is the provision of stop members which arrest the normally free actuation of the lever element —and the resultant flexing of the supplemental spring produced thereby—at predetermined and preadjusted points in the movement of the spring supported parts, and which then coacts with the interlocked lever-spring elements to produce an increased bending or flexing of the main leaf spring, whereby the latter is stiffened and reinforced in its action, against further continued movement of the said parts. This feature of construction is of particular advantage in securing a quick and effective suppression of the effects of abnormal or excessive load or rebound stresses and chocks that cannot be entirely restrained and absorbed by the normal action of the supplemental spring elements.

A further specific object of my improvements is the arrangement of supplemental spring elements in such relation to their chassis supports that the reactive pressure on the said supports will always tend to prevent any relative transverse or longitudinal movements of the body and axle members, and will become increasingly effective in checking and restraining such objectionable actions as the vertical oscillations of the said members increase in magnitude. This feature is of importance both because it checks the rocking and end pitching of the tonneau—and thus increases its "easy riding" qualities—and also because it adds to the lateral stability of the vehicle body and thereby tends to prevent overturning or "skidding", or loss of steering control when the vehicle is being driven over rough or slippery pavements, or is turning corners at a high speed, etc. etc.

Still another specific feature of certain preferred embodiments of my present improvements is the provision of a spring suspension organization in which the supplemental resilient element (or elements) is of such a character, or is so disposed relative to the other parts of the combination, that it can be made of much greater length, and can, therefore, have a considerably larger range of flexural action, than is possible with other forms of analogous constructions heretofore used. This increased range of supplemental spring flexure makes it possible to correspondingly increase the elastic sensitiveness and resiliency of the suspension system to minor stresses and shocks without sacrificing in any degree the ulti-resistance of the combination, as a whole, to larger oscillatory movements of the body and axle members. Or, stated in another way, the increased flexural capacity of the supplemental spring makes it possible to use a larger ratio of movement between the relative vertical displacement of the main spring and the cooperative angular motion of the actuating lever element, and thereby eliminate certain structural and functional difficulties which are encountered in the construction, the assembly, and the practical operation of these devices in the contracted space that is available for their installation on the majority of motor driven vehicles. This specific feature of my improvements is, therefore, of considerable practical importance.

Other detail features which characterize various exemplary and specific embodiments of this invention will be made apparent, to those skilled in this art, by the following description and explanation of several structures which are herein disclosed as illustrative of various applications of my improved construction to different forms and types of spring suspension systems. But it will be understood that these several illustrative embodiments exemplify only a few of the ways in which the basic and characteristic principles of my new organization can be utilized; and that the accompanying specification—of which the drawings are a part—are not to be regarded as limiting the field of such utilization.

Sheet 1 of the drawings illustrates one of the preferred forms of my invention as applied to the usual type of cross leaf main spring mounting for the front axle of a Ford car. On this sheet Fig. 1 is a side elevation—in partial section on the plane, 1, 1 of Fig. 4—of the aforesaid form, and shows the parts of the combination in the position which they occupy under normal static load conditions; Fig. 2 is a side elevation of this same construction and shows the parts in the position which they assume under kinetic compressive stress; Fig. 3 is a similar view to those of Figs. 1 and 2, and shows the elements of the organization under the action of a rebound or recoil shock; Fig. 4 is a plan view on the plane 4, 4, of Fig. 1; Fig. 5 is an end elevation in partial section on the plane 5, 5, of Fig. 4; Fig. 6 is a partial sectional side elevation on the plane 6, 6, of Fig. 4; and Figs. 7 and 8 are diagrams indicating the relation of the movements of certain of the elements of the combination.

Sheet 2 of the drawings illustrates various other embodiments of my improved construction as it may be utilized in conjunction with either the front or the rear cross-leaf springs of a suspension system. On this sheet Fig. 9 is a sectional side elevation, on the plane 9, 9, of Fig. 10, of one of my dual acting supplemental spring devices applied to a front cross-leaf spring; Fig. 10 is a partial plan view on the plane 10, 10, of Fig. 9; Fig. 11 is an end elevation—in partial section—on the plane 11, 11, of Fig. 9, showing the supplemental spring elements in the position which they assume under compressive stress on this system; Fig. 12 is an enlarged side elevation—partially in section on the plane 12, 12 of Figs. 10 and 11—which shows the parts in the position assumed on rebound, and which also diagrammatically indicates the position which certain of those parts assume both under normal load and under compressive stresses; Fig. 13 illustrates another embodiment of my present invention as utilized in conjunction with the rear cross-leaf suspension of a Ford car; Fig. 14 is a sectional end view on the plane 14, 14, of Fig. 13, and shows the position of the parts when they are subjected to a kinetic compression stress; Fig. 15 is a front elevation of another form of my improved construction as applied to a rear cross leaf spring mounting of a Ford car, the parts being there shown in the position which they assume under normal load; Fig. 16 illustrates another application of my invention to a front cross leaf suspension this figure showing, in full lines, the position of the parts under conditions of static equilibrium, and also indicating, in dotted lines, the positions assumed by certain of those parts when they are subjected to either compressive or rebound stresses; Fig. 17 is a front elevation of still another embodiment of my improved construction as adapted to a front cross-leaf spring mounting of a Ford car; Fig. 18 illustrates still another application of this invention to the same form of main spring suspension as is shown in Fig. 17; and Fig. 19 is a partial sectional elevation, on the plane 19, 19, of Fig. 18.

Sheet 3 of the drawings illustrates three other embodiments of my invention as utilized in conjunction with different forms of side-leaf spring suspensions. Fig 20 is a side elevation of one of these embodiments as utilized in conjunction with a full elliptic spring mounting; Fig. 21 is a sectional elevation on the plane 21, 21, of Fig. 20; Fig. 22 is an end view—in partial section on the plane 22—22, of Fig. 20—of the supplemental spring system of this organization; Fig. 23 is an enlarged side elevation of this same construction and shows, in full lines, the position which the parts assume under kinetic compressive stress; Fig. 24 is a corresponding side elevation of a portion of the structure and shows the position assumed by the interconnected lever and auxiliary spring elements when the body and axle members rebound or recoil to the position indicated in the dotted lines of Fig. 23; Fig. 25 is a side elevation of another exemplification of my improvements applied to a three-quarter elliptic or scroll spring suspension for the rear portion of a car—the front members of the lever elements of this construction being removed for the purpose of more clearly illustrating certain of the parts; Fig. 26 is a complete side elevation of the construction illustrated in Fig. 25, and shows, in full lines, the parts of that construction in the position that they assume under kinetic compressive stress, and also indicates in dotted lines, the reverse position assumed by certain of those parts when the body and axle members rebound from the normal load position shown in Fig. 25; Fig. 27 is a partial sectional end elevation on the plane 27, 27, of Fig. 25; Fig. 28 is a cross section on the plane 28—28 of Fig. 25; and Fig. 29 is a side elevation, partially in section, of another embodiment of my invention as applied to a semi-elliptic side spring suspension—the full lines of this figure indicating the positions of the elements under static load, and the dotted lines thereof indicating the positions of the said elements when the system is subjected to compressive stresses.

Referring now to the preferred embodiment of my invention which is illustrated on Sheet 1 of the drawings: In this construction the end eye of the cross-leaf main spring 2 is pivotally connected, by a forked shackle link 3, to the short arm of an actuating lever element that is made up of two side members 7, 7', which are symmetrically disposed on the opposite sides of the main spring and are integrally connected with each other by the shackle bolt 8, and the spacer and spacer bolt 13. This lever element is pivotally supported, at an intermediate point of its length, on the pintle bolt 15 which also cooperates with the shackle and spacer bolts 8 and 13 in maintaining the side members of the lever in integral operative relationship to each other. The pintle bolt 15 is carried by a special saddle 16 which is substituted for the usual form of front axle perch, and which is clamped to the axle member by means of the ordinary perch bolt 17 and the stirrup bolt 18. This special saddle is also provided with an aperture for receiving the end of the radius rod that is ordinarily bolted through the eye of the usual axle perch.

The supplemental spring element of this combination comprises two helical coil springs 20, 20 that are symmetrically disposed on opposite sides of the main spring 2, and are preferably made of elliptical cross section—as best shown in Fig. 4—so as to project only a short distance on each side of the said main spring. The opposite ends of these supplemental spring elements are cooperatively engaged by two follower plates 23, 24 that are respectively connected to a main spring clip 25 by means of four bolts 26—26 and 26'—26'. The inner overlapping ends of these bolts slide longitudinally in slots 29 that are formed on opposite sides of the main spring clip 25 (as best shown in Fig. 6) and are each provided with a laterally offset eye 30, that is adapted to engage the adjacent portion of the opposite bolt. The outer ends of the two sets of bolts are adjustably attached to the follower plates 23 and 24 by means of the nuts 31, the connection being of such a character that the bolts tend to move with the follower plates.

The inner ends of the actuating lever members 7, 7', are provided with forked heads 32 which are securely riveted and bolted to these lever members (as best shown in Fig. 4) and which are adapted to engage on their lower sides with the recessed portions of the upper follower plate 23, and to engage on their upper sides with a cross bar 33 that carries two bolts 34, which extend downwardly through the centers of the springs 20. The lower ends of these bolts 34 are slidably engaged with the cross heads of stirrup shaped bolts 35 which are adjustably connected at their opposite extremities with the lower follower plate 24.

The supplemental springs 20—which may be reinforced, if desired, by an additional inner pair of coils 20'—are made considerably longer than the normal distance between the follower plates 23, 24; and when the parts are assembled these springs are therefore under sufficient initial tension to support the inner ends of the actuating lever in the normal load position shown in Fig. 1; and in this position the bolt and nut connections 26—26'—30 and 34—35 are so adjusted that there is no lost motion between the opposite edges of the lever heads 32 and the parts 23 and 33 with which they respectively engage. When the body and axle members are subjected to kinetic loads or stresses, that tend to move the said members towards each other, the said stresses act in opposite directions on the pintle bolt connections 8 and 15 to rock the lever 7—7' in a counter-clockwise direction. This movement of the lever lifts the lower follower plate 24, through the bolt connections 34—35, and compresses the supplemental spring element against the upper follower plate 23, which is prevented from moving away from the main spring 2 by the engagement of the eyes 30, of the bolts 26, with the lower side of the clip 25. The upward movement of the lower follower plate 24 carries with it the bolts 26, 26', which slide freely through the slots 29 in said clip; and this upward movement—and the concurrent compression of the supplemental springs can continue until the upper or inner surface of the said plate abuts against the lower eyes 30 of the upper bolts 26 and is therefore stopped from further relative movement with respect to the main spring and its attached clip.

The last described action of the parts is produced, as previously indicated, by a concurrent movement of the main spring 2 toward the axle member and the counter-clockwise rocking motion of the lever 7—7' on its axle bolt support 15; and the accompanying compression of the supplemental springs results in part from the upward connected movement of the lever element and the lower follower plate 24 and in part from the connected downward movement of the main spring clip 25 and the upper following plate 23. When the relative opposed movements of these parts has been arrested in the manner above described the lever member has been rocked through the angle $a—b$, and the parts have then assumed the position shown in Fig. 2. All of the lever and spring elements of the combination are now locked against further relative movement; and any further approach of the main spring and axle members produces a reversed clockwise movement of the lever which carries its outer end upwardly—from the angular position $b$ to the angular position $b'$—and this upward movement of the outer end of the lever, combined with the downward movement of the central portion of the main spring (and its attached clip 25), results in a positive bending flexure of the said main spring that is in excess of the flexure normally imposed thereon by load stresses alone.

When the relative approach of the body and axle members has been ultimately checked by the successive cooperative flexures of the supplemental and main spring elements, the parts will immediately tend to return to their normal load positions by reason of the elastic resiliency of the system; and the kinetic inertia of the moving parts will cause them to rebound or recoil above and beyond this normal load position. In my improved construction this tendency is quickly arrested in the following manner:

When the lever and supplemental spring elements have returned to the position shown in Fig. 1 the lower edges of the heads 32 are in operative engagement with the upper follower plate 23; and any upward movement of the body and main spring above this position acts to rock the lever in a clockwise direction on its pivot support 15, thereby depressing the upper follower plate and compressing the supplemental springs 22 against the lower follower plate 24—the latter plate being now held in fixed relation to the mainspring clip by the bolts 26'. This downward compression of the supplemental springs resists the upward movement of the body—or the relative separation of the body and axle members—by its reaction both on the downwardly swinging lever element and on the upwardly moving main spring clip and the lower follower plate connected thereto; and a progressively increasing restraint is thereby imposed on the rebound movement of the parts. The last described action can continue until the under face of the top follower plate comes into engagement with the eyes 30 of the lower bolts 26', after which the inter-connected lever and spring elements are again locked in fixed relation to one another. The parts are then in the position shown in Fig. 3— (the lever having been rocked through the angle $a—c$)—and any further rebound movement of the body and main spring results in a bodily lifting of the inner end of the lever, and a corresponding depression of the shackle bolt connection 3—8, that carries the said connection to the position $c'$ (see Fig. 3), and thus imposes an increased reverse flexure on the main spring 2, that will quickly and positively arrest any further separation of the spring supported parts.

It will be noted that the positive restraining action of this system in checking oscillatory movements in both directions from the normal static load position, presents the following characteristics: First, the positive compression of the supplemental springs in a direction opposite to that in which the body and the main spring is moving; second, the establishment of a gradually increasing reactive pressure on an intermediate portion of the main spring which tends both to directly check the bodily movement of that spring, and also to prevent the opposite flexure of that element; third, the positive arrest of the supplemental spring compression at a predetermined point in the movement, and a locking of the interconnected lever and spring elements in fixed relation to each other; and fourth, the bodily reversal of the lever movement, when the parts move beyond their locked position, with a consequent imposition of an increased bending or flexing stress on the main spring element.

This embodiment of my invention is also characterized by an effective check or restraint against any side sway or lateral pitching of the vehicle body. The resistance to side sway or rocking is secured by arranging the supplemental springs 20 at a considerable angle to the main spring and axle parts, so that any tendency to lateral movement is resisted by opposing pressures of the inclined supplemental springs against their seats and against the main spring clips to which the said seats are connected. This restraint to sidewise movement of the body is augmented—in case any such movement is initiated—by an accompanying movement of the lever elements which will immediately increase the reactive pressure on one or the other of the supplemental spring seats. Thus, in the position of the parts shown in Figs. 1 or 2 any lateral movement of the main spring and body members toward the left will be accompanied by an outward swinging of the shackle 3 that will raise the shackle bolt connection 8 (as best shown in the diagram of Fig. 7) and this will rock the associated lever element in a clockwise direction and increase the inwardly directed thrust against the lower follower plate 24 and the main spring clip 25 which is connected thereto by the bolts 26'. The concurrent movement of the opposite end of the main spring will correspondingly swing the shackle connection at that end inwardly, and this will depress the shackle bolt connection 8 on the righthand side of the vehicle and raise the inner end of the lever on that side thus increasing the outwardly directed thrust on the other follower plate and on its associated spring clip. It is obvious that the inwardly directed thrust on the lefthand elements 24 and 25 of the system will cooperate with the outwardly directed thrust on the connected elements 23 and 25 of the righthand portion of the system to quickly and effectively check any tendency of the body to move toward the left; and the reverse and reciprocal action of these same parts will correspondingly resist any movement of the body to the right.

The longitudinal pitching of the body—which tends to twist the main spring between its body connection and its end shackle connections—is resisted, in my improved construction, by the use of a pair of symmetrically disposed supplemental springs that are arranged on opposite sides of the main spring, and which always exert (through their action on one or the other of their end plates 23 or 24) a balanced pressure on the opposite edges of the said main spring that tends to effectively prevent any twisting of that element on its longitudinal axis. This steadying action of the laterally separated supplemental springs is effectively supplemented in my construction by the mounting of the main spring end between the two side members 7 and 7' of the actuating lever, and by the provision of an unusually long pivot bolt support 15 for the said lever member. Any lateral movement of the shackle connection 3 either with respect to the lever or with respect to the eye of the main spring—(such as might result from loose fitting or wear of the pivot connections between the parts)—is also prevented, in this construction, by making the sides of the shackle engage closely with the inner faces of the lever members 7 and 7', and by so designing and arranging the parts that the lower eye bolt of this shackle is always wholly or partially within the outer forked end of the lever member—as shown clearly in the three views of Figs. 1, 2, and 3.

The symmetrical arrangement of the supplemental spring elements in pairs, with one of the said elements on each side of the main spring, enables me to use secondary springs of relatively great length, and thereby increase the range of compressive action of those elements without disturbing or altering the usual arrangement of the chassis part. This increase in the effective range of action of the secondary resilient parts of the combination correspondingly increases the capacity of the suspension system to elastically resist and absorb the minor shocks and the smaller oscillatory movements imposed on the vehicle parts, without diminishing the ultimate carrying capacity of the combination. The use of supplemental springs of this character has also an important structural advantage because such springs may be made of comparatively light wire which can be more easily wound to the desired form, and more easily and uniformly tempered than is possible with short heavy springs of relatively larger wire. As already stated I prefer to make the supplemental springs of this construction of an elliptical cross-section form in order to secure the greatest lateral compactness of structure. The use of the lighter wire in making up these springs has therefore still another advantage in reducing the difficulty of making coils of this elliptical form; although such springs can be readily constructed of any desired size by either winding the coils on an elliptical mandrel or by laterally compressing circularly wound coils before the material is finally tempered.

The increase in the compressive movement of the supplemental spring elements makes it desirable to provide for maintaining an alignment between the arcuate movement of the actuating lever heads 32 and the axial movement of the ends of the springs 20. In the preferred embodiment of my invention, which has been above described, this alignment is secured by inclining the axes of the supplemental spring elements at a small angle to the chord of the arcuate movement of the lever heads and utilizing the upward and downward movements of the supplemental spring supports to produce a lateral displacement of said axes which is substantially equal to the versed sine component of the accompanying arcuate movement. The manner in which this compensation is effected is clearly shown in the diagram of Fig. 8, in which the small circles e and e' indicate the points of engagement between the ends of the lever 7—7' and the parts 23 and 33 respectively, and the lines e'—e—f, e'—f' and e—f, indicate the corresponding positions which the axes of the supplemental springs assume, when the parts of the system occupy the positions shown respectively in Figs. 1, 2 and 3. When the system is subjected to a compressive shock and the lever is rocked counter-clockwise through the angles a—b, the point e' does not move along the line e'—f' through the entire range of action; but the small displacement of the point of contact e' from the axial line of compression is taken care of by the rolling contact between the lower curved face of the cross bar 33, and the upper curved edges of the heads 32—this rolling contact tending normally to increase the effective radius of engagement between the coacting parts as the lever rocks upwardly.

In the construction shown in Figs. 1 to 8 I have also made provision for varying the effective ratio between the relative vertical movement of the body and axle members and the resultant angular movement of the actuating lever, so as to obtain a greater linear compression of the supplemental spring for a given movement of rebound than is secured for the same movement of compression. This enables me to obtain an increased resistance to a recoil or separation of the spring supported parts, and thereby more quickly and effectively check and absorb the objectionable rebound action of the system. I obtain this result by connecting the shackle bolt 8 to a part of the actuating lever which moves in an arc that is inclined at an acute angle to the axle member, and by also inclining the longitudinal axis of the shackle link 3 at an acute angle to the aforesaid arc of movement. The resultant action of the parts, when connected in this manner, is shown in the diagram of Fig. 7, in which the line h—h' indicates the path of movement of the end eye of the main spring 2; and in which the arcs a—b and a—c'' represent the relative angular movements of the lever that are produced by equal vertical movements of the main spring end from the central position of normal static equilibrium. It will be readily observed that the arc of movement a—c'' is considerably greater than the arc of movement a—b; and it follows at once that the rebound movement necessary to produce the maximum compression of the supplemental springs is considerably less than the compression movement required for that purpose.

The diagram of Fig. 7 also indicates clearly the action of the parts when the body, and the eye of the main spring connected thereto, tends to move sidewise, or in the direction of the line g—g. When such movement occurs the shackle link connection between the eye of the main spring and the short arm of the lever swings the latter through the arc a—d and thereby exerts an increasing reactive pressure on the end seats of the supplemental springs which resists and arrests this side sway in the manner previously described.

The second form of construction illustrated in Figs. 9, 10, 11 and 12 differs from the first described embodiment of my invention in having the lever element 36 pivotally supported on a rocker or roller connection with the axle saddle (see Fig. 12) and so disposed relatively thereto that its inner end engages with the lower ends of its supplemental spring connections instead of with the upper ends thereof. In this construction I also preferably employ two supplemental springs 37, 37 which are of elliptical cross-section (as shown best in Fig. 10) and which are symmetrically disposed on the opposite sides of the main spring 2. The upper ends of these supplemental springs are engaged by a follower plate 38 that is slidably engaged with a bolt 39, the lower end of which is connected to the main spring clip 40. This clip is secured to the main spring by the two cross bolts 41 and is provided with recessed pockets to receive and guide the follower plates 42 that carry the lower ends of the supplemental spring elements 37, 37. The inner ends of the lever elements 36— which are of substantially the same construction as the lever elements 7—7'—are provided with a cross bar or pin 43 which is adapted to engage with the lower ends of the stirrup bolts 44, 44 that pass upwardly through the centers of the springs 37 and are adjustably connected at the top with the upper follower plate 38, and which is also adapted to engage, through the medium of its heads 45—45, with the lower follower plates 42.

The general operation of the organization last described is substantially the same as that of the construction shown in Figs. 1 to 8. When the parts are subjected to a compressive stress the lever 36 is rocked in a counter clockwise direction on its axle saddle and lifts the lower follower plates 42 thereby compressing the supplemental springs 37 against the upper follower plate 38, the latter being concurrently and simultaneously moved downward by its bodily connection (through the bolt 39 and the clip 40) with the main spring 2. This action continues until the cross bar 43 of the lever has been raised into engagement with the lower side of the main spring 2—or with the ends of the slots in the clip heads 40— as shown in Fig. 11. When this engagement takes place the interconnected lever spring members are locked against further relative movement; and any additional approach of the body and axle members forces the inner end of the lever 36 downwardly, and correspondingly lifts the outer end, thereby imposing an increasing bending strain on the main spring. When the parts return to the normal static load position shown in Fig. 9, and begin to move upwardly away from that position—by reason of the recoil or separation of the body and axle members—the cross bars 43 engage with the lower ends of the stirrup bolts 44, thereby pulling the upper follower plate 38 downwardly and compressing the supplemental springs 37 against the lower follower plates 42 which are now supported on the base of the main spring clip 40. This compression of the supplemental springs, between the downwardly moving top plate 38 and the upwardly moving main spring clip supports, resists and checks the rebound movement by the reactive pressure of the supplemental springs, both on the lever connections therewith and on the lower seat supports therefor; the last mentioned pressure acting directly against upward movement of the body and the main spring itself. This positive progressive compression of the supplemental springs on rebound movement continues until the central cross bar of the upper head 38 comes into engagement with the boss on the top of the upwardly moving main spring clip. This engagement again locks the interconnected parts against further relative movement, and a continued separation of the body and axle members is thereafter resisted by the reverse flexure on the main spring alone—this reverse flexure being augmented and increased by the lifting of the inner end of the locked lever, and the corresponding depression of the outer end thereof.

The general operative characteristics of the organization shown in Figs. 9 to 12 are substantially the same as those possessed by the first described embodiment of my invention; and the last considered construction also presents the advantages attendant upon the use of a pair of long range supplemental springs that are arranged symmetrically, one on each side of the main spring. But this particular embodiment of my improvements does not have as great a capacity for resisting and checking side sway, or rolling, of the vehicle body as is possessed by the first described organization. It also lacks certain specific advantages that are possessed by the preferred construction shown on the first sheet of the drawings.

In the construction shown in Figs. 13 and 14 the end of the main spring 2 is directly coupled to the outer arm of the lever 46; and the intermediate portion of this member— which is of the double arm form previously described—is pivotally connected to the axle perch 47 by a solid shackle link 48, the ends of which are engaged between the side arms of the lever and the forked end of the axle perch. The inner ends of the side arms of the lever 46 are riveted to a solid head 49 of elliptical cross section (see Fig. 14), the opposite sides of which are adapted to engage respectively with the upper loop of a V-shaped stirrup bolt 50 and the recessed end of a hollow bolt 51. The supplemental spring which is used in this construction comprises a single volute coil 52 which is engaged at its upper end by the head of the hollow bolt 51, and is supported at its opposite extremity on the follower plate 53, to which the lower ends of the stirrup bolt 50 are adjustably attached. The bottom of the hollow bolt 51 is slidably engaged by the head of another bolt 54, and the lower end of this bolt is adjustably connected, by the nut 55, with a clip support 56, that is clamped on the main spring by means of the cross bolts 57.

The dual action of this third exemplification of my improvements—in reciprocally resisting and checking the movements of the parts in either direction from the normal load position of Fig. 13—will be readily understood. When the body and axle members are forced toward each other the lever 46 is rocked in a clockwise direction on its shackle bolt support, and the lower follower plate 53 is lifted away from its engagement with the upper face of the main spring clip 56, while the upper end of the supplemental spring 52 is concurrently depressed by its connection (through the bolt members 51—54) with the said clip. This positive supplemental spring compression opposes the bodily separation of the body and axle members by the opposing thrust of its two ends against the upwardly moving lever 46 and the downwardly moving clip 56; and the supplemental spring resistance to these opposing movements progressively increases until the upper face of the follower plate 53 has come into engagement with the lower end of the bolt 51, as shown in Fig. 14. After this occurs the full flexural resistance of the main spring 2 is brought into play to resist and quickly check any further compression of the system; the said main spring action being augmented by the bodily downward movement of the locked lever supplemental spring combination which correspondingly lifts the outer end of the lever element thereof. When the parts return to the normal load position and rebound movement occurs, the lever 46 is rocked in a counter-clockwise direction on its pivot connection with the axle; and the supplemental spring 42 is then compressed, against the main spring clip support for the lower follower plate 53, by the downward movement of the hollow bolt 51. If the progressively increased thrust of the compressed supplemental spring, on the oppositely moving lever and main spring members, is not sufficient to check the rebound movement, the last described action will ultimately bring the lower end of the bolt 51 in contact with the lower follower plate 53; and the interconnected lever-spring elements will then be again locked in position, and a further separation of the body and axle members will be resisted by a reverse binding or flexure of the main spring in the same manner as has been heretofore more fully described.

The generic features of operation which are presented by the organization illustrated in Figs. 13 and 14 are substantially the same as those which characterize the action of the previously considered constructions. The last described organization also presents—by reason of the inclined arrangement of the supplemental spring axes—an effective resistance to the side sway or lateral rolling of the vehicle body; and it also posseses some capacity for checking the axial twisting of the main spring, and the longitudinal fore and aft pitching of the vehicle tonneau—when the parts are in either normal load position or are subjected to rebound—because of the overhang of the enlarged base of the volute supplemental spring on each side of its main spring support. But the use of a single volute spring construction is not as effective in stabilizing the spring suspension system as is the use of a pair of supplemental springs which are arranged one on each side of the main spring; and the single spring construction last described also necessarily involves the employment of a shorter and heavier spring and a corresponding reduction in range of the supplemental spring compression. In these respects—as well as in other minor features of construction and operation—the organization of Figs. 13 and 14 is operatively inferior to both of the previously described embodiments of my invention.

In the construction illustrated in Fig. 15, the end eye of the main spring 2 is directly coupled to the outer end of the double arm lever member 60, and the intermediate portion of the said member is rockably supported on a saddle block 61, by a pair of swinging shackle links 62. The inner end of the side arms of this lever are riveted together and are connected to opposite extremities of a long supplemental leaf spring 63, by a flexible strap or chain 64, and a pin and link coupling 65, which also serves, at times, as a means for supporting the lower end of the secondary spring 63 from the main spring clip bolt 66. The intermediate portion of the supplemental leaf spring is flexibly attached (as by means of a pivoted saddle clip 67, and a forked eye block 68), to the differential gear case of the rear axle; and in the position of static equilibrium, both ends of this spring are in opposing pressure engagement with the main spring and the axle member—the initial tension of the flexed secondary element being sufficient to support the normal load pressure that is transmitted to it through the main spring-lever-and-axle-connections therewith. These connections are so adjusted (by changing the length of the flexible strap 64, or by the use of a rotable eccentric pin joint at one of the points of engagement between the parts) that in the normal static load position, shown in Fig. 15, the inner end of the lever member 60 is also in tensioned engagement with both ends of the supplemental leaf spring, so that any motion of the lever in either direction is immediately accompanied by a corresponding movement, and an increased flexural strain, in the said spring.

The operation of the shock absorber organization last described is as follows: When the system is subjected to an increased load stress, and the body and axle members approach each other, the lever 60 is rocked in a clockwise direction on the shackle support 62; the lower end of the secondary leaf spring is lifted away from the axle; and an increased supplemental spring pressure is exerted on the under side of the downwardly moving leaf spring 2, which tends both to directly resist such movement and also to prevent the positive bending, or straightening out, of this main resilient element of the system. The opposed movements of the lever and the main spring will impose a progressively increased tension on the flexed supplemental spring 63, which will be sufficient, in most instances, to arrest the closing or compression of the system under kinetic load stresses; but if it not, the aforesaid movements will continue until the intermediate cross bolt of the pin and link connections 65 strikes the under side of the main spring clip—or the main spring clip bolt 66 engages with the lower ends of the slots in the upper part of the said link connections—after which the interconnected lever-spring elements are locked relatively to each other, and any further approach of the body and axle members is resisted by the elastic distortion of the main spring between its body and lever connections. When the parts return to normal load position, and begin to move upwardly therefrom, the rebound or recoil action is arrested by a reverse or reciprocal flexure of the spring elements which results from the cooperative and concurrent engagement between the lever and the upper end of the supplemental spring 63 (through the chain connection 64) and between the main spring clip bolt 66 and the lower eye of that spring (through the link connections 65). This double engagement imposes a closing pressure on the secondary leaf spring that is transmitted to, and carried by, the upwardly moving body and main spring members; and which acts, as before, to both restrain that movement and to check the recoil flexure of the main spring. If the rebound is so severe that it cannot be entirely checked by the supplemental spring action alone, the final arrest of the oscillatory movement will be effected by the engagement of the under edge of the lever with the lower eye of the spring 63—with the consequent locking of the interengaged parts against further relative displacement—and the subsequent reversed or negative bending of the main spring between its upwardly moving body and clip connections and its downwardly moving outer end connection to the lever 60.

The shock absorber organization illustrated in Fig. 15 (which shows only the right hand half of the complete suspension system) also presents an effective resistance to any side sway, or lateral rolling of the vehicle body; and it also possesses some capacity for checking any axial or longitudinal twisting of the main spring and any corresponding fore and aft pitching of the tonneau parts. When the parts are in the normal position of static equilibrium (Fig. 15), or are subjected to kinetic compressive stresses, the upper eyes of the supplemental springs, 63, are pressing outwardly and upwardly against the downwardly inclined surfaces of the main spring 2; and the oppositely directed pressure of these eyes on the right and left hand sides of the suspension system tend to effectually restrain any sidewise movement of the suspended parts. When the parts rebound above normal load position, the opposite sides of the suspension system are subjected to the reversely inclined and inwardly directed tensions imposed on the double link connections 65; and these stresses act symmetrically, on both the opposite ends and the opposite edges of the main spring 2, to check or restrain both the lateral displacement and the axial twisting of that member.

The supplemental spring elements of my Fig. 15 construction have a relatively large range of flexural movement and occupy a comparatively small amount of vertical space. This construction has also certain structural advantages which are due primarily to the comparatively small number of parts, and to the simple and easily constructed form of supplemental spring which is employed. For all of these reasons it is well adapted for use on low priced cars, particularly those which have a comparatively small amount of space between the axle and main spring member.

In Fig. 16 I illustrate another application of my improvements in which the lever and the supplemental spring elements are quite different in form from any of those previously considered. In this organization the actuating lever element comprises two pair of side arms 70 and 71 which are inclined at a considerable angle to each other and are adapted to engage at their inner ends with the opposite extremities of supplemental tension springs 72 that are arranged on opposite sides of the main spring 2 in the manner shown more in detail in Fig. 27. The side arms of this lever member are integrally joined to each other by the spacer block and rivet connections 73, and also by the cross bolts 74 and 75 that serves to pivotally couple the said lever member to the swinging shackle support 76 and eye of the main spring 2. The eye ends of the pair of supplemental springs 72 are cross connected by rods or pins 77, 78 which are adapted to be engaged both by the forked inner ends of the lever arms 70—71, and also by the hooked shaped extremities of the blocks 79 and 80 that are attached to the body of the vehicle. The latter member is also provided with a block 81 which is so positioned as to engage with the opposite edges of the lever members, 70 and 71, when the latter are rocked through a predetermined angle by either the approach or separation of the body and axle members of the vehicle.

When the parts of this system are subjected to a compressive kinetic stress the relative movement of the body and axle members toward each other rocks the lever member 70—71 in a counter-clockwise direction on its shackle bolt support 74. The engagement of the forked end of the lever member 71 lifts the rod 77 out of its hooked support 79 and imposes an added tension on the supplemental springs 72 which is transmitted through the said springs to the hook supports 80; and this tension opposes the closing of the spring connected parts both by the downward pull on the end of the lever 71 and by the upward pull on the body connection 80. This counter-clockwise swing of the lever member 70—71 may continue until the upper edges of the arm 70 come into engagement with the lower face of the block 81, after which the relative movement of the lever-spring elements is arrested, and the flexural resistance of the main spring alone is brought into play to check a further approach of the body and axle members. When the parts rebound from the normal load position shown in full lines in Fig. 16 the lever member 70—71 is rocked in a clockwise direction on its shackle bolt support 74, and the engagement of the hooked end of the arm 70 with the cross pin 78 moves that pin out of engagement with the hook support 80 and again imposes a positive tension on the supplemental spring 72 which is transmitted to, and carried by, the upper hook support 79. In this action the separation of the body and axle members is resisted by the upward pull of the supplemental spring 72 on the lever arms 70, and by the downward pull of the other extremities of these springs on the body support 79. This supplemental spring resistance to rebound movement is progressively increased as the said movement continues; and ultimately the lever and spring members are locked in position with respect to each other by the engagement of the lower edges of the arm 71 with the stop block 81. After this the further opening of the spring supported system is checked by the reverse bending of the main spring 2, and this reverse bending is increased as before, by the bodily lifting of the inner ends of the locked lever system, and the corresponding depression of the main spring eye bolt 75.

The illustration of Fig. 16—like those of Figs. 1, 2, 3, 9, 12, 13 and 15—depicts only one half of the complete spring suspension system for one end of the vehicle body; and in all of these organizations both extremities of the cross leaf main spring 2 are connected to, and symmetrically supported by, similar and reversely disposed combinations of lever-actuated-double-acting-supplemental-spring elements. In the form of construction shown in the first fifteen figures of the drawings the auxiliary lever-spring combination on the right hand side of the suspension system is structurally independent of that on the opposite side—except for the fact that both of the said combinations are cooperatively attached to the same chassis members of the complete assembly—and the stresses imposed on the supplemental spring elements are directly transmitted to intermediate portions of the main spring, and act thereon to resist the flexural movements that are ordinarily imposed upon a free main spring suspension. But in the organization illustrated in Fig. 16 the tensions imposed on the supplemental springs by the movements of the system— while they act in a direction to always oppose those movements—do not act directly on the main spring element of the combination, and the latter is therefore left free to flex or bend, either positively or negatively, as the body and axle members either approach or separate from one another. In some instances it is preferable to utilize the reaction of the supplemental springs on the intermediate flexible portions of the main spring (as is done in the four forms of construction first considered); but in the other instances it may be desirable to carry the entire supplemental spring stresses on non-resilient parts of the chassis frame as is done in the last described form of construction. The shock absorber system shown in Fig. 16 also differs from those previously considered in having the adjacent ends of the reversely inclined supplemental spring elements—on the opposite sides of the vehicle body—connected to a single central body support 80, that provides for a common adjustment of the interacting lever spring connections, and which also serves, to some extent, to equalize the initial tensions in the two sets of secondary resilient elements.

The combination which is now being considered possesses a certain capacity to resist side sway of the vehicle body, but on account of the differences enumerated in the preceding paragraph, the lateral restraint imposed on the suspension system is somewhat different in character from that which characterizes the operation of the organizations illustrated in Figs. 1, 2, 3 and 13; and the specific paired arrangement of supplemental springs employed in my Fig. 16 construction does not have any effect in checking longitudinal pitching of the tonneau, or in preventing the longitudinal or axial twisting of the main spring element 2.

In Fig. 17 I have illustrated a complete suspension system for the front axle portion of a vehicle, in which the right and left members of the supplemental spring elements are of substantially the same form as are shown in Fig. 15 construction. In the arrangement shown in Fig. 17 the lever elements 82 are pivotally mounted on the axle perch supports of the radius rod connection 83; and are provided with curved arm extensions 84 to which the ends of the main spring 2 are pivotally coupled by the swinging shackle links 85. In the normal static load position of the parts the inner extremities of these lever members 82 are concurrently engaged with the eye ends of the supplemental leaf springs 86; and the pin bolts inserted in the said ends are also operatively connected to the axle member by means of the flexible straps or chains 87 and the forked posts 88. arranged one on each side of the lever members 82. The intermediate portions of the supplemental springs 86 are flexibly attached to the block 89 that is bolted to the central part of the main spring and its body support; and an adjacent portion of each of these springs is connected to the axle member by a pair of swinging links 90 that are provided with cross rollers 91 which engage with the opposite faces of the supplemental leaf springs.

The operation of the last described suspension system is as follows: When the system is subjected to a kinetic compressive stress the approach of the body and axle members rocks the lever elements 82 downwardly on their pivot supports 83 and depresses the lower sides of the supplemental leaf springs 86, thereby imposing a bending strain thereon which is transmitted to the axle member partly through the coupling connections 91, 90, and partly through the post members 88 that support the upper eye ends of the said springs. The downward pressures of the supplemental spring members on the axle tend, of course, to check the relative upward movement of the axle toward the body of the vehicle. If this action is insufficient to arrest the approach movement of the parts, the motion of the levers 82 will continue until the lower side of the leaf springs 86 are forced into engagement with the upper edge of the axle, after which the lever spring members will become locked against further relative movement and the flexure resistance of the main spring 2 will be brought into play to ultimately check the effect of the compressive shock. When the parts rebound beyond the normal load position shown in Fig. 17 the lever members 82 are rocked upwardly and lift the upper sides of the leaf springs 86 away from their end supports on the posts 88 and impose a flexural strain on the said springs which is again transmitted to the axle member, partly through the flexible link connections 90, 91 and partly through the tension connections 87. Both of these connections exert an upward pull on the axle member which tends to prevent it from moving away from the body member of the vehicle. Under the action of excessive rebound shocks the deflection of the supplemental springs may continue until the upper sides of those springs are brought into engagement either with a part of the body frame, or with the under side of the main leaf spring 2; and after this occurs the relative movement between the lever and the main spring is arrested and the reverse flexure of the latter is utilized to ultimately check the rebound or separation of the spring connected parts.

In the construction illustrated in Fig. 18 the lever element 92 is pivotally supported at its outer extremity on the axle perch 93 and is coupled, at an intermediate point of its length, to the end of the main spring 2 by means of the solid shackle link 94. The opposite end of the main spring is carried by a corresponding lever element—the inner end of which is shown at the right hand side of the figure—and the adjacent extremities of these oppositely disposed levers are doubly connected to a common supplemental spring system, which comprises the two "hour glass" coils 94, 94, by means of the adjustable stirrup bolts 95—95 and 96—96 which engage at their opposite ends with the upper and lower follower plates 97 and 98. In the normal static load position of the parts the lower follower plate 98 rests on a bracket 99 that is attached to the axle member, and the upper follower plate 97 is also held in fixed position thereto by a stirrup bolt 100. When the combination is subjected to an increased load stress the relative approach of the body and axle members rocks the actuating levers 92 toward the axle and this movement is transmitted to the upper follower plate 97 through the stirrup bolt connections 95, 95, thereby compressing the supplemental springs 94 against the lower follower plate 98. This downward movement of the upper follower plate carries with it the stirrup bolt 100—which is bent around the lower side of the axle—so that no obstacle is interposed to the concurrent downward movement of the adjacent central portion of the main spring. When the parts rebound above the position shown in Fig. 18 the lever elements 92 move upwardly toward the body and, through the action of the stirrup bolt connections 96—96, lift the lower follower plate 98 and reversely compress the supplemental spring elements against the upper follower plate 97, which is now held against movement by the engagement of the lower end of the stirrup bolt 100 with the under side of the axle. In both of these movements— that resulting from compression, and that resulting from rebound of the parts—the reaction pressures of the supplemental springs are opposed in direction to the accompanying displacements of the axle supports therefor, and therefore tend to directly resist and check the relative motion of the vertically oscillating body and axle members. If the movements are excessive in amount the angular swing of the lever elements, and the accompanying flexure of the supplemental springs, is arrested by the engagement of the lever ends with one of the relatively stationary follower plates, 98 or 97; and after such engagement occurs, the interconnected lever spring parts are locked, as before, in relative position, and further approach or separation of the body and axle parts is resisted solely by the direct or reverse flexure of the main spring element 2.

Both of the last described organizations— those shown in Figs. 17, 18 and 19—differ from those previously considered in having the seat connections for the supplemental spring elements connected to, and supported, by the axle member of the vehicle instead of by the body or main spring member thereof. But the general functional character of these combinations—as respects their generic features of operation—are not altered by this change in the points of connection between the supplemental spring elements and the parts of the vehicle against which they exercise their reaction pressures when subjected to increased flexure by kinetic compressive shocks or rebound stresses. But neither of the last described exemplifications of my improvements possess the capacity of utilizing the reactive resistances of the supplemental spring elements to restrain side rolling of "fore and aft" pitching of the vehicle tonneau; and in these respects they fail to embody all of the features of my present invention. Both of the organizations just considered are, however, very simple in construction, and compact in structure; and are, therefore, well adapted for use on relatively light low priced cars.

On the third sheet of the drawings I have illustrated three embodiments of my invention, as it may be utilized in conjunction with three forms of main side leaf spring; viz, a full elliptic spring, a three-quarter elliptic or scroll suspension spring, and a semi-elliptic leaf spring member. In all of these forms the central portion of the lower main leaf spring is rigidly secured to the axle and the inner ends of this resilient member are pivoted directly, either to the adjacent extremity of the upper half of the full elliptic spring or to brackets that are non-resiliently secured to the body frame. In all of these exemplifications of my invention a single auxiliary lever spring system is interposed between the outer ends of the lower main leaf spring and that part of the body system to which the said end is ordinarily connected by swinging shackle links. The side leaf organizations which I have depicted as illustrative embodiments of my improvements are analogous to the forms of cross leaf spring suspensions that are shown respectively in Figs. 1 to 12, 16 and 17; and in describing the said side leaf organizations I will use, as far as possible, lettered numerals to indicate the parts that correspond functionally to the equivalent elements of those previously described systems.

In the embodiment shown in Figs. 20 to 24 the double arm lever member—(which comprises the two side bars $7^a$ and $7^b$)—is pivotally supported, at its outer end, on the cross bolt $8^a$ of an extension bracket or clip 101 that is bolted to the extremity of the main leaf spring member $2^a$; and is directly coupled, at an intermediate point in its length, to the adjacent eye of the upper leaf spring member $2^b$, by the pintle bolt $15^b$. The side arms $7^a$—$7^b$ of the lever are integrally connected to each other—by the ends of the shouldered pintle bolt $15^b$ and by the spacers and spacer bolts $13^a$ and $13^b$— and are operatively engaged at their inner ends by the member $33^a$ which serves to couple the said lever to the dual connections with the double acting supplemental springs $20^a$, $20^a$. These connections comprise blocks or heads 102, which are adapted to engage on their lower edges with recessed portions of an upper follower plate $23^a$, and which are apertured to receive the ends of U bolts $35^a$ that extend down to the centers of the supplemental springs $20^a$, and are slidably engaged at their middle loops by the heads of the bolts $34^a$. The lower extremities of these bolts $34^a$ are rigidly secured in the lower follower plates $24^a$, $24^a$, which normally rests on a common support 103, that is suspended from the lower main spring $2^a$ by means of the curved channel plate 104, and the bracket and clip connections 105 and $25^b$. The follower plates $23^a$ and $24^a$, are each provided with telescoping sleeves, 106—106, which cooperate with the said plates to completely enclose the supplemental springs and protect them from the weather; and which may also be used as receptacles for a small quantity of lubricant that will serve to prevent corrosion and undue wear of the lever actuated parts. Each one of the upper sleeves—i. e., the ones secured to the top follower plate $23^a$—are provided at their lower ends with a pair of lugs 107 which are apertured to receive bolts 108 and 109 that are disposed in corresponding pairs on the opposite sides of the main spring $2^a$, and are adjustably connected to the support member 103.

The general operative characteristics of this eighth embodiment of my invention are substantially the same as those which distinguish the construction shown in Figs. 1 to 8. When the system is subjected to kinetic compression stresses the lever $7^a$—$7^b$, is rocked in a clockwise direction by the relative approach of the axle and body members; and the supplemental springs are compressed against the lower follower plates $24^a$, thereby imposing a reactive pressure against the support 103 that is transmitted, through the cantilever suspension member 104, to the center and intermediate portion of the lower main spring $2^a$, and serves to directly check and restrain the relative upward movement of the axle. In the form of construction shown in full lines in Fig. 20, the downward pressure of the supplemental springs on the support 103 produces an upward thrust against the main spring clip connection $25^b$ which serves to increase the positive flexure of "straightening out" of the right hand side of the main leaf spring, and this in turn tends to increase the curvature, and thereby diminish the compressive bending, of the left hand portion of this spring. This same effect can be more directly secured by extending the suspension member 104 to the left and coupling it directly to the main spring clip 25ᵃ—as shown in dotted lines in Fig. 20—in which case either the right hand clip connection 25ᵇ, or the center clip support 105 is omitted. With this arrangement of parts the reactive pressure of the secondary resilient elements on the lower follower heads 24ᵃ, 24ᵃ exerts a direct downward pull on the intermediate resilient portions of the primary spring member (on either the left hand side alone, or on both the right and left hand sides together) that tends to initially restrain the usual straightening and lengthening of the curved main spring under an increase in the load stress. In practice I prefer the arrangement shown in full lines in my drawings for the reason that the left hand end of the spring 2ᵃ is independently reinforced and substantially stiffened by its rigid connection with the lever supporting clip 101; and for the further reason that the rocking action of the cantilever suspension support illustrated in Fig. 20 assists in maintaining the alignment between the arcuate movement of the actuating lever connections, 33ᵃ—102, etc., and the axes of the supplemental springs 20ᵃ—20ᵃ;—as will be more fully explained later.

The downward movement of upper follower plate 23ᵃ carries with it the stirrup bolts, 35ᵃ, and the lugs 107, thereby disengaging these elements from the heads of the bolts 34ᵃ, 108 and 109, which remain in fixed position with respect to the lower plate 24ᵃ and the support 103 to which they are connected. The closing movement of these parts may continue—with a corresponding and progressively increased compression of the supplemental springs 20ᵃ—until the upper ends of the lower sleeves 106, and the heads of the bolts 34ᵃ, 108 and 109, all concurrently engage with the downwardly moving follower plate 23ᵃ (as shown in full lines in Fig. 23); after which the interengaged lever and spring elements are locked against further relative motion toward one another, and any continued compressive stress on the system is resisted and restrained by the positive flexure of the main spring members 2ᵃ and 2ᵇ. This final closing movement lifts the inner end of the locked lever 7ᵃ—7ᵇ, and thereby separates the outer ends of the leaf springs 2ᵃ—2ᵇ, thus imposing an added bending stress on those springs which will quickly check any further approach of the body and axle parts.

When the various components of the suspension system return to the normal load position shown in Fig. 20, and begin to rebound or recoil from that position, the tension engagement between the heads of the U bolts 35ᵃ and the bolts 34ᵃ lifts the lower follower plate 24ᵃ away from the support 103, and compresses the supplemental springs 20ᵃ against the upper follower plate 23ᵃ, which is now held in fixed relation to the said support by the concurrent engagement of the four bolts 108 and 109 with the lugs 107. Under ordinary conditions of operation this progressive reverse compression of the secondary resilient elements—which may or may not be accompanied by the concurrent reciprocal bending of the main spring elements, 2ᵃ—2ᵇ—will be sufficient to check the rebound movement; but if it is not, the continued separation of the body and axle members will carry the parts to the position shown in full lines in Fig. 24, (and also partially indicated in the dotted lines of Fig. 23), in which the lever-spring elements are again interlocked by the simultaneous abutment of the lower sleeves 106 and the bolt 34ᵃ with the upper follower plate 23ᵃ (as clearly shown in the partial sectional view of Fig. 24); and any further recoil or separation of the tonneau and running gear components of the chassis frame imposes an increased negative curvature, or reverse flexure on the semi-elliptic leaf springs that will be augmented by the downward pull on the inner end of the locked lever 7ᵃ—7ᵇ and the resultant drawing together of the eye bolt connections 15ᵃ and 15ᵇ.

When a chassis frame is provided with side leaf spring suspension systems any horizontal displacement of the body with respect to the axle members is, in large part, eliminated by the character of the connections ordinarily employed to couple the centers and ends of the main leaf springs to the tonneau and running gear parts; and this is one reason for the use of this type of spring suspension on all heavy or high speed motor vehicles. But the angular side sway, or lateral rolling, of the body on its elastic supports is not prevented by the employment of side leaf springs in place of cross leaf springs—because the non-concurrent differential compression or expansion of the said supports on the opposite sides of the vehicle, will necessarily result in such rolling of the body—and the only ways in which this undesirable effect can be restrained and checked are: first, to reinforce and stiffen the main side leaf springs against longitudinal or axial twisting between their center supports on the axle and their end connections with the body; and second, to "damp" or decrease the amplitude, and increase the free elastic period of oscillation, of the side suspension systems and thereby secure a more complete overlapping, and a greater mutual compensation and neutralization of the reverse or differential action of these systems.

In the exemplification of my invention shown in Figs. 20—24 the primary side leaf spring 2ᵃ is substantially stiffened at its lever connected end by the broad U-shaped bracket 101; and the intermediate portions of this member are braced against transverse torsion or side twist by the symmetrical opposing pressures of the supplemental springs 20ª 20ª on the two edges thereof—this bracing and steadying pressure becoming greater and greater as the displacement of the parts from normal load position increases. This embodiment of my invention also comprises means for "damping" the free period of vibration of the secondary springs and thereby "slowing down" their expansion after both the closing and the rebound movements of the spring supported parts. In the form shown the upper follower plate 23ª is provided with two port openings 110, which open into the enclosed chambers containing the two supplemental springs 20ª, and which are covered by simple flat valves, 111, of flexible metal, or leather, or other suitable material. When the follower plates 23ª—24ª move toward each other the valves open to permit of the free escape of air from the interior of the supplemental spring chambers; but when this movement ceases, and the parts begin to return to normal static load position, the valves close and the only admission of air to the expanded cells is through the sliding joints between the sleeves 106, and between the legs of the U bolts 35ª and the upper follower plate 23ª. These relatively movable parts may be fitted so closely, that the normal expansion movements of the supplemental springs will create a substantial reduction in pressure in the enclosing chambers; and as the aggregate cross sectional area of these chambers may be fifteen or twenty square inches, the excess pressure of the atmosphere on the expanding spring cells may amount to one hundred pounds or more. This single acting or one way pneumatic "check" action cooperates with the frictional resistance to the movements of the lever actuated elements to impose a damping stress of several hundred pounds on the ends of the main spring members 2ª and 2ᵇ (at the pivot bo't connections 8ª, 8ᵇ and 15ª); and this very substantial restraint will greatly decelerate the return of the stressed parts to the normal static load position—from either direction of displacement therefrom—and will, thereby, not only increase the time but also decrease the amplitude, of the "back swing" of both the resilient elements and of the body parts carried thereby. The joint effects of the symmetrically disposed supplemental springs (acting to prevent transverse torsion of the main side leaf springs) and of the damping resistance to recoil movements of the system; all combine and cooperate to effectively resist and quickly extinguish any tendency to side rolling of the tonneau portions of the chassis frame that might otherwise be produced by unsymmetrical displacements of the running gear parts in passing over uneven roads or in making sudden turns at high speeds.

In the use of the side leaf spring suspension systems, of the character above described, the "fore and aft" pitching of the vehicle body does not impose any axial twisting stress on the main leaf springs; and this endwise rocking of the tonneau parts is also, in large part, restrained by the longitudinal stiffness of the primary suspension elements, and by the semi-rigid, or non-resilient nature of the connections and couplings between the centers and eye ends of these elements and the axle and body members respectively. Such pitching as does occur results from the unsymmetrical or differential action of the front and rear suspension systems when the two ends of the chassis frame are subjected to non-current shocks and stresses. In the application of my invention to these systems this last action is primarily resisted and controlled by the elastic and frictional damping of the oscillations of each system per se; and the check imposed on the endwise swinging, or alternate rise and fall of the opposite extremities of the vehicle body, becomes very powerful and effective when this damping control is increased and utilized in the manner above described.

The exemplification of my improvements illustrated in Figs. 20–24 also presents the advantages attendant upon the use of relatively light supplemental springs, having a wide range of compression movement for a small displacement of the body and axle members in either direction from normal load position. The substantial alignment of the arcuate movement of the lever connections 33ª—102 etc., with the axial movement of the supplemental spring coils is effected (as in my Figs. 1–8 construction) by arranging the cooperative elements in such relation to each other that the chord B—C of the said arc is inclined at a small angle to the axis 22—22 of the supplemental springs; and the flexural displacements of the main spring ends (at 8ª, 8ᵇ and 15ª) serve both to flatten that arc and to carry the inner end of the lever inwardly as the rebound movement increases. When the form of supplemental spring support suspension shown in full lines in Fig. 20 is employed, this automatic alignment action is made still more exact by the counter-clockwise rocking of the cantilever bridge member 104, on its central pivot support 105; which tends to correspondingly swing the axis 22—22 to the left as the parts recoil from the position shown in Fig. 20 to that of Fig. 23. But in all of the arrangements illustrated (either in the full or dotted lines of Fig. 20) the slightly curved path of movement of the connector element 33ª coincides so closely with the axial line 22—22, that no sensible side strain is imposed, on either the tension rods 35ª or the sliding sleeve 106, at any point in the entire range of supplemental spring compression; and, as a reciprocal effect, the mutual guiding action of the coengaged and coacting parts serve to always maintain the lever connected ends of the main spring elements in proper lateral relationship with each other.

It will be understood, from the preceding description, that the last considered form of lever actuated supplemental spring construction presents substantially all of the generic and specific features of organization that characterize the first described application of my invention to a main cross leaf spring suspension; and that it also presents certain detail features of structure that are of particular advantage in connection with side leaf spring systems. But it will also be understood that the supplemental spring elements 20 (of my Fig. 1-8 construction) may also be supported and enclosed in the manner illustrated in Figs. 20, 22, 23 and 24, when it is desired to utilize the pneumatic check and the automatic protection and lubrication functions of the closed chamber mountings for the secondary resilient elements of the combination.

Figs. 25, 26, 27 and 28 show another embodiment of my improvements, as applied to a main side leaf spring of the three-quarter-elliptic, or the semi-elliptic-scroll support type. This organization is analogous in many respects to the side leaf spring suspension system illustrated in Fig. 16; and comprises a four arm lever 70ª—70ᵇ—71ª—71ᵇ which is pivotally connected at an intermediate point in its length to the end of the main leaf spring 2ª by the pintle bolt 74ª; and which is flexibly supported at its outer extremity on a cross bolt 75ª that is carried by a clip 112 on the lower part of the quarter elliptic scroll spring 113. Each pair of side arms, 70ª—70ᵇ and 71ª—71ᵇ, are rigidly secured to each other by suitable spacers and spacer bolts; and the overlapping outer ends of these arms are connected by the shouldered ends of the pintle bolts 74ª and 75ª (as shown in Fig. 26) and by rivets 114, etc., etc., so as to constitute, in effect, an integral member. The inner ends of the lever arms are forked to engage with two supplemental spring connectors 77ª and 78ª, which normally rest in hooked blocks 79ª and 80ª that are respectively attached to the bracket support for the scroll spring 113 and to a stiff leaf spring member 113′, both of which are carried by the vehicle body. The two symmetrically disposed supplemental tension springs 72ª, 72ᵇ, are provided with end eyes which are loosely engaged with the opposite extremities of the connectors 77ª and 78ª (as best shown in Fig. 27); and the initial tension of these springs is adjusted to maintain the parts of the system in the position shown in Fig. 25.

When the last described system is subjected to kinetic compression stresses the approach of the axle and body members rocks the actuating lever element in a counter-clockwise direction—toward the position shown in full lines in Fig. 26—thereby lifting the connector 77ª out of its support 79ª, and imposing an additional tension on the secondary resilient elements that is transmitted to the semi-rigid body member 113′ and serves to directly resist the relative downward movement of the vehicle tonneau. This movement may continue—under abnormal or excessive load stress—until the arms 70ª—70ᵇ are lifted into contact with the stop block 81ª (see Fig. 26). When this occurs the interengaged lever-spring elements are locked relatively to each other; and any further approach of the axle and body members imposes a positive complemental bending strain on the lever connected main leaf springs, 2ª and 113, which quickly absorb and arrest the residue of the compressive shock.

When the parts return to, and rebound above, the normal load position, the actuating lever is rocked in a clockwise direction; the lower connector 78ª is drawn downwardly out of engagement with the block 80ª; and an added tension is again imposed on the supplemental springs 72ª—72ᵇ which are now supported at their upper extremities, on the block 79ª. This tension is progressively increased—and acts to more and more strongly resist and restrain the relative upward motion of the body parts, as the rebound or recoil movement continues—until the ends of the lever arms 71ª—71ᵇ strike against the rear face of the stop block 81ª (see dotted line position of Fig. 26); after which the further bodily movement of the interlocked elements serves to impose a complemental reverse bending, or increased negative curvature, on the main suspension springs 2ª and 113, that will quickly check such excessive or abnormal "overthrows" of the connected parts.

In the construction shown in Figs. 25-28, I provide for "damping" the free period, and reducing the amplitude of the return "swing", of the elastic suspension elements by a friction check mechanism which is mounted on the intermediate pintle bolt support 74ª of the oscillating lever, and which comprises a pair of telescoping cups 115 and 116 that are provided with slots 117 which engage the end portion of the main leaf spring 2ª, thereby preventing relative rotation of the cups with reference thereto. The adjacent inner faces of the lever arms 70ª and 70ᵇ are provided with friction dies 118 that are non-rotatably secured thereto, and which engage with recessed ends of the cup members 115 and 116. Any desired degree of pressure on the frictionally engaged surfaces may be obtained by interposing expansion springs 119 between the ends of the drums 115 and 116; and this elastic pressure may be supplemented, if desired, by the adjustment of the nuts at the ends of the pintle bolt 74ª. This friction check mechanism acts to resist the rocking movement of the lever on its pivot connection with the main spring 2ª, and thereby damps the flexural action of both the primary and the secondary resilient elements of the combination. This damping action assists in restraining and checking both the side rolling and the "fore and aft" pitching of the vehicle body in the manner which has already been explained.

In the form of organization last described there is no direct connection between the supplemental spring supports and the intermediate flexible portion of the main spring; and the reactive stresses of the supplemental spring supports cannot, therefore, be utilized to restrain or prevent a transverse torsion or axial twisting, of the said main spring. In the construction of Figs. 25–28 this axial twisting is checked, first, by stiffening the lower portion of the quarter-elliptic body spring 113 (by use of the rigid clip support 112 that carries the pintle bolt 75ª), and second, by the extended bearing for the adjacent pivot bolt 74ª, which is tightly engaged with the outer eye of the main spring 2ª, and which is also kept in close engagement with the rigid lever arms by the automatic action of the spring expanded friction cups 115 and 116.

The organization illustrated in the last figure of my drawings also possesses all of the more important features of advantage that are characteristic of the side leaf spring suspensions previously described. In this organization the outer end of the semi-elliptic main spring 2ª is coupled to the adjacent extremity of a double arm lever 60ª by means of a solid shackle link 120, and the intermediate portion of this lever is pivotally supported, on the U-shaped body bracket 61ª by means of the pivot bolt 121. The inner extremities of the double arm lever 60ª are adapted to engage with the eye ends of a supplemental spring member 63ª—63ᵇ, which is rigidly mounted on a clip 67ª that is flexibly supported on the axle bracket 68ª. The upper portion 63ª of this secondary spring member consists of a single multiple-leaf spring which is positioned centrally above the main leaf spring 2ª, and is provided at its extremity with a cross pin 127 that is engaged by the upper edges of the lever arms; and the lower portion 63ᵇ of the said spring consists of two sets of leaf elements that are symmetrically disposed one on each side of the main spring, and which are provided, at their eye ends, with a cross bolt 122 that is adapted to engage with the lower face of the primary suspension element. The initial form of these supplemental leaf springs is such that when they are assembled in position in the clip support 67ª the upward pressure of the twin elements 63ᵇ is sufficient to maintain the parts in the static load position shown in full lines in Fig. 29.

When this system is subjected to a compressive shock the relative approach movement of the body and axle parts will rock the inner ends of the double arm lever 60ª downwardly, and will thereby bend the lower portions of the supplemental leaf spring away from the upwardly moving axle; and the increased strain thus imposed on the secondary resilient element will be transmitted therethrough to the outer extremity of the upper portion 63ª and exert a pressure on the upper side of the main leaf spring which will tend both to resist the closing of the system and also to reduce the accompanying flexure, or straightening out, of the main spring member. This supplemental spring action is ultimately arrested by the engagement of the lower edges of the lever member with a cross bolt 123 that is carried by the bracket 61ª; and after such engagement the interconnected lever-spring elements are locked against relative movement, and any further approach of the body and axle members is arrested by the positive flexure of the comparatively stiff main spring 2ª. The return of the parts to normal load position, and the recoil of the elastic supporting elements above that position, is accompanied by a counter-clockwise rotation of the actuating lever on its pintle bolt support 121; and this movement brings the upper edges of the lever into engagement with the ends of the cross bolt 127, and bends the upper portion 63ª of the supplemental leaf spring upwardly; and the increased strain thus imposed thereon is transmitted to the cross bolt 122 that is now engaged with the lower side of the main leaf spring 2ª. The upward pressure thus exerted on the intermediate portion of the downwardly moving main spring acts to resist both relative separation of the body and axle parts, and also to restrain, or reduce, the usual reverse bending, or "curling up" of the primary suspension member. If the recoil or rebound movement is excessive, the upper edges of the lever will be brought into engagement with a second cross bolt 124 in the body bracket 61ª—this will occur when the axis of the lever has assumed the dotted line position c—c' of Fig. 29—and any further separation of the body and axle parts will then be resisted solely by the increased reverse strain imposed by the action of the interlocked parts on the main leaf spring.

In the form of construction which has just been considered the damping of the supplemental spring movement is affected by the peculiar form and action of those elements themselves. It will be observed that the secondary springs are composed of a large number of relatively thin leaves, which are clipped together at a number of points 125, 126, etc.; and when these springs are bent to the extent indicated by the dotted lines of Fig. 29, there is a large amount of relative sliding movement between the individual leaves. This sliding movement is quite strongly resisted by the frictional engagement of the superimposed leaves—which is augmented by the pressure of the retaining clips 125 and 126—and as a result of this both the positive flexure of the secondary springs and the recoil of those stressed elements to their normal static load position, is very effectively damped, and the said recoil movements are correspondingly lengthened in period and decreased in amplitude. In this arrangement of main and supplemental spring parts there is a further damping action on the flexural movements of the main spring itself, that is due in part to the pressure exerted by the secondary spring on the supporting leaves of the primary spring (which tends to press those leaves more tightly together) and in part to the necessary sliding engagement between the engaged portions of the two springs. These combined damping effects serve to check both side rolling and endwise pitching of the spring supported tonneau in the same manner in which those objectionable movements are checked in the operation of the two previously described organizations. The construction shown in Fig. 29 also serves to resist, to some extent, the lateral torsion, or axial twisting of the main spring between its axial and lever connections. This restraint is produced by the symmetrical pressure exerted on opposite edges of the main spring by the lower pair of supplemental spring elements 63$^b$; and the outer end of the main leaf spring, may, if desired, be further stiffened and braced against transverse or lateral movement by making its opposite edges engage closely with the inner faces of the forked body bracket 61$^a$.

The form of structure last described does not present as many operative advantages as are possessed by some of the earlier described organizations; but it is a convenient one to use in connection with some forms of semi-elliptic spring suspensions because of the small number of parts which it contains, and because of the small vertical space that is required for its installation.

It will be understood that in applying this invention to any species of elastic suspension organization, all of the main spring members thereof—whether they be of the cross leaf or the side leaf type—are preferably provided with at least one of my improved supplemental-lever-actuated-spring units; and that these units are also preferably arranged in symmetrical relation to the central axis of the vehicle body. Thus in the case of cross leaf spring suspensions, the front axle spring and the rear axle spring may each be equipped with two auxiliary lever-spring combinations for conjointing the opposite ends of the said cross spring to the chassis frame; but in the case of side leaf spring systems the front axle member and the rear axle member may each be provided with a single supplemental lever-spring unit for connecting oppositely turned ends of the said springs to the adjacent parts of the vehicle. In all of these improved organizations the complete assemblage, of main spring members and symmetrically disposed secondary spring units, constitute a complementary system of interconnected elastic elements which mutually coact and cooperate to not only resist and check vertical oscillations of the body and axle parts, but to also restrain and control both side rolling and longitudinal pitching of the tonneau with respect to the running gear. As previously explained all of the hereinbefore described embodiments of my invention are particularly, and in general equally, effective in elastically cushioning and absorbing both the very light and the excessively heavy stresses and shocks of operation; but these various exemplary constructions vary in respect to their capacity to prevent transverse and endwise sway of the body on its elastic supports. In all cases however these last mentioned movements are restrained in greater or less degree by the symmetrically balanced arrangement of the supplemental spring units of the complete complemental system; primarily, because each of said units comprises an initially tensioned element that is increasingly stressed and flexed whenever the vehicle parts are displaced in either direction from normal load position, and provides for the transmission of this progressively increased tension to a support member that is moved, or tends to move, in the direction opposite to that of the applied stress; and secondarily because these lines of pull or thrust of the different supplemental springs on their respective supports are, in general, inclined to the vertical and, in the case of any two symmetrically disposed units, oblique to each other or to the central axis of the vehicle; thus establishing and maintaining a transverse balance of counteracting forces that tends to stabilize the spring connected parts of the system against horizontal or lateral movements. In the case of those constructions in which each supplemental unit comprises a group of two (or more) double acting secondary springs, the different elements of each group are preferably arranged in symmetrical, or interbalanced, relation to an intermediate resilient portion of the main spring with which they are directly connected or conjoined; and in such constructions the similarly directed lines of secondary spring tension establish locally applied balances of pressure that help to prevent torsion or twisting of the said primary resilient element, and thereby restrain either the longitudinal rocking of the spring supported parts (in case of cross leaf spring suspensions) or the transverse rolling of the vehicle body (in case of side leaf suspension systems).

The magnitude of any lateral swinging movement (i. e., any side sway or "fore and aft" pitching motion) of the tonneau parts on the running gear supports, is strongly influenced both by the amplitude of the vertical oscillations of the system—(particularly those accompanying a rebound or lifting of the vehicle body above its normal load position)—and by the free period of those oscillations. All of the embodiments of my invention hereinbefore considered provide very effective means for restraining and quickly arresting rebound action, and thereby diminishing the lateral disturbances resulting therefrom; and in certain of these embodiments I have also made special provision for lengthening, or slowing down, the period of recoil of the stressed elastic elements, and thereby increasing the amount of overlapping, and mutually compensatory, action of the separate unit systems that constitute the complete complementary suspension organization. The damping of the recoil movements of the associated units brings the successive or nonconcurrent oscillations of different main spring members more nearly into synchronism with each other, and thus assist in preventing relative up and down movements of the opposite sides and opposite ends of the vehicle body when the running gear parts pass over irregularities in the road surface or are otherwise subjected to unsymmetrical stresses. The use of a pneumatic or friction check mechanism, or other equivalent control means, in conjunction with other features of this invention, is therefore of advantage in securing and maintaining the most efficient lateral stabilization of both cross leaf and side leaf suspension systems.

It will be apparent that all of the herein described exemplifications of my improvements also present certain generic characteristics of construction and of structural function, although they differ widely in the specific form and arrangement of individual parts. All of these exemplifications have, for example, an initially tensioned double acting-supplemental-spring, the opposite extremities of which are alternately conjoined with two relatively movable vehicle members in such manner that any displacement of the said members in either direction from the position of static equilibrium immediately results in imposing an increased and increasing tension on the said spring; the term "tension" being used, in its broad sense, to indicate a condition of internal strain that may result either from an extension, or compression or torsion of the elastic element. And, as here shown, these supplemental spring tensions are, in all cases, reciprocally transmitted to, and carried by, parts of the system which move, or tend to move in a direction opposite to that of the transmitted forces, so that the latter act, or react, to directly restrain such movements, or such tendencies to movement. In the forms of construction here illustrated the alternate conjunction of the opposite extremities of the double-acting-springs with their actuating instrumentalities—and the reciprocal transmission of the spring tensions to their supports or carriers—is effected by a pair, or a dual set, of single-acting, or "one-way," connections, so arranged that the parts of one of the pair or sets come into operation when the reciprocal elements of the other set are inactive:—the term "connection" being also used in its broad sense to indicate any means for effecting the desired causeful or functional engagement between the mutually interacting parts. The various exemplary embodiments of my invention also present another common feature of structure; to wit, a pair or set of single acting "stops" which are so disposed as to arrest the progressively increased flexure of "tensioning" of the double-acting-supplemental springs at predetermined points in both the compressive, or closing, and the expansive, or opening (rebound), movements of the spring supported parts. And in this case also the word "stop" is used in its broad significance; viz, to indicate any means for limiting the flexing of the supplemental spring, both for the purpose of preventing excessive distortion or possible rupture of that element, and also for the purpose of locking the conjoined lever-spring-members in such manner as to impose an added flexural bending on the main spring element of the combination.

It will now be understood that various changes in the detail design, and in the relative disposition, of the cooperative members of my improved organization, may be made, without departing from the spirit of my present disclosure; and, with this disclosure as a guide, those skilled in this art will have no difficulty in utilizing the different features of my invention—in whole or in part as may be desired—in any widely varied forms of shock absorber construction that may be required to best adapt these improvements to particular uses on different classes of road vehicles, and on different types of chassis and spring supports therefor. Extended explanations of certain now preferred commercial embodiments of this invention have been given in order to facilitate the clear and complete understanding of its characteristic features; but it is to be clearly understood that I do not limit myself to the use of any of the specific illustrative mechanisms thus considered, except so far as may be indicated in the appended claims; and what I claim is:

1. In a spring suspension system for two relatively movable members the combination of a lever flexibly engaged with both members, a double action spring supported on one of said members, and a dual connection between said lever and the ends of the said spring whereby the latter is subjected to increased flexure whenever the interengaged members move in either direction from the position of static equilibrium.

2. An elastic suspension system for connecting two relatively movable members, which comprises a rocking lever pivotally engaged with both of the said members, a double action spring, and a dual set of alternately active connections conjoining the opposite extremities of the spring with the lever and with one of the relatively movable members whereby the said spring is increasingly flexed when the said members are relatively moved in either direction from their normal static load position.

3. An elastic suspension system for vehicles which comprises a lever flexibly engaged to two relatively movable vehicle parts, a double action spring element, and a dual set of reciprocally active coupling elements for alternately connecting opposite ends of the spring to the lever and to one of the said vehicle parts, whereby a progressively increased stress is applied to the said spring when the vehicle parts move in either direction from normal load position.

4. A spring suspension system for two relatively movable members which comprises the combination of a double action spring element, a lever conjoining the said members with the said spring elements and stop elements for limiting the angular motion of the said lever in both directions of its movement from the position of static equilibrium.

5. A spring suspension organization which comprises the combination of a double action spring, a lever pivotally engaged with two relatively movable members of the said organization, a dual set of one way connections for alternately coupling the lever with opposite extremities of the said spring and a second set of connections for reciprocally engaging the uncoupled ends of the spring and supporting them in fixed relation to one of said movable members.

6. A spring suspension system for vehicles which comprises the combination of a double action spring, a lever, means for flexibly connecting said lever to two relatively movable parts of the vehicle, means for alternately connecting another part of said lever to opposite extremities of the said spring, means for concurrently supporting the end of the spring not connected to the lever from one of said relatively movable parts, and means for limiting the movement of the interconnected portions of said lever and said spring with respect to said supporting means.

7. An elastic suspension for two relatively movable members which comprises a spring supported on one of said members, a lever pivotally connected at an intermediate point in its length with the other of said members, means for flexibly coupling one end of the lever to the spring supporting member, and dual means for conjoining the opposite end of said lever with said both ends of the spring, whereby an increased flexure is imposed on the latter whenever one of said members is moved in either direction from the position of static equilibrium.

8. In a spring suspension system the combination of a spring, a supporting member therefor, a lever flexibly coupled to the said support at one of its extremities and operatively engaged with both ends of the said spring at its other extremity, and a pivotal mounting for an intermediate portion of the said lever, whereby the said spring is subjected to an increased stress whenever the said lever mounting moves toward or from the said spring support.

9. In a spring suspension for vehicles the combination of a spring supported on one of two relatively movable chassis members, a lever operatively engaged at its opposite ends with both extremities of the said spring and with the said member respectively, a flexible coupling between an intermediate part of said lever and the other of the said chassis members, whereby the said spring is subjected to increased flexural strain when the said members are displaced from the position of static equilibrium.

10. In a spring suspension for vehicles the combination of a double acting spring supported on one of two relatively movable chassis members, a rocking lever flexibly engaged at one end with the spring supporting member and at an intermediate point with the other of said chassis members, and a dual system of single acting connections for alternately conjoining the remaining end of the lever with the opposite extremities of the said spring whereby the latter is positively or increasingly flexed when the said chassis members are displaced in either direction from normal load position.

11. A shock absorber organization, for two relatively movable members, which comprises the combination of a spring supported one one of said members, a lever flexibly coupled at one end to the same member, means for conjoining an intermediate part of said lever to the second of said members; means for alternately connecting the other end of the lever to opposite extremities of the said spring whereby the latter is increasingly flexed in a direction opposite to that in which the spring supporting member tends to move when the parts are displaced to either side of the position of static equilibrium, and stops for limiting the concurrent movement of the interconnected lever spring elements in both directions.

12. A spring suspension system for vehicles which comprises a double acting spring, means for supporting said spring on one of the relatively movable chassis parts of the vehicle, a rocking lever, means for conjoining the said lever and said spring with another part of the vehicle chassis whereby the said spring is increasingly flexed in a direction opposite to that in which its chassis support is moved when the vehicle parts are displaced to either side of normal load position, and means for locking said lever and said spring against further movement relative to said support when the said parts have been displaced by a predetermined amount.

13. A spring suspension system which comprises a main spring, a double acting supplemental spring, a rocking lever member, a pivotal support therefor, and means for conjoining the said springs with the said lever whereby the latter is rocked in reversed directions on its pivotal support and the double acting resilient element is concurrently subjected to an increasing flexure when the main spring element is moved in opposite directions from the position of static equilibrium.

14. In a spring suspension system for vehicles the combination of a main leaf spring, a supplemental spring, means for alternately supporting opposite extremities thereof from one of the relatively movable parts of the system, and a suspension member for conjoining one end of the said main spring with the said supplemental spring whereby the latter is positively and increasingly flexed by a movement of the main spring in opposite directions from static load position.

15. In a spring suspension system for two relatively movable members the combination of a main spring secured at its center to one of said members, a lever pivotally supported on the other of said members, a double acting auxiliary spring, a support therefor, a pair of single acting connections for alternately engaging the opposite extremities of such auxiliary spring with said support, and means for conjoining the said lever with the said springs whereby the auxiliary spring is subjected to increasing flexure whenever the said members move from the position of normal static equilibrium.

16. In a spring suspension system for vehicles the combination of a main spring secured to one of the relatively movable vehicle parts, a lever pivotally engaged with another of said parts, a flexible coupling between the lever and one end of the main spring, a double acting supplemental spring, a support therefor, a pair of one way, or single acting, connections between the supplemental spring and the said support means for alternately coupling the lever to opposite extremities of the double acting spring when the relatively movable parts are reciprocally displaced from normal load position, and stops for arresting the movement of the lever relative to the auxiliary spring support when said displacements have reached a predetermined amount.

17. An elastic support system for vehicles which comprises a main leaf spring a double acting supplemental spring mounted on one of the relatively movable members of the system, a lever flexibly coupled to one end of the main spring and pivotally engaged at another point in its length with that part of the support to which the end of the main spring is ordinarily attached, a dual set of alternately active connections between said lever and said supplemental spring whereby the latter is positively or increasingly flexed whenever the said relatively movable members are displaced in either direction from normal load position, and stops for arresting such positive flexure of said supplemental spring when the said displacement has reached a predetermined amount.

18. A spring suspension for vehicles which comprises the combination of a main spring, a double acting supplemental spring, means for supporting the supplemental spring from an intermediate flexible portion of the main spring, a lever coupled at one extremity to the said supplemental spring and at its opposite extremity to the end of the said main spring, and a pivotal connection between an intermediate part of the said lever and that part of the vehicle to which the end of the main spring is ordinarily attached.

19. A spring support for vehicles which comprises a main leaf spring, a supplemental spring flexibly engaged with an intermediate flexible portion thereof, a suspension member coupled at its opposite extremities with the said supplemental spring and with an end portion of the said main spring, a pivotal connection between an intermediate part of the suspension member and that part of the vehicle to which the end portion of the main spring is ordinarily attached, and stops for limiting the relative movements of said suspension member and of said main spring.

20. An elastic suspension for vehicles which comprises a main leaf spring, a supplemental spring mounted on an intermediate flexible portion thereof, rocking lever member pivotally coupled at one end to the said main spring, a pivotal support for an intermediate part of said lever, a pair of alternately active connections between the other end of said lever and the extremities of the supplemental spring whereby the latter is positively or increasingly flexed in a direction opposed to the movement of its support whenever the suspended parts are displaced from normal load position, and a pair of stops for locking said lever and said support against further relative movement when the said displacement exceeds a predetermined amount.

21. An elastic suspension system for vehicles which comprises the combination of a main leaf spring secured at its center to one part of the chassis frame, a double acting supplemental spring adjacent to an intermediate flexible portion of the main spring, a suspension member cooperatively coupled to the end of the main spring and to another part of the chassis frame, and a double set of single acting or one way connections and stops conjoining the opposite extremities of the supplemental spring with the said suspension member and with the said intermediate portion of the main spring whereby the latter is subjected to a progressively increased restraint when the main spring is moved in either direction from the normal load position.

22. In an improved suspension system for vehicles the combination of a main leaf spring, a pair of double acting supplemental springs supported one on each side of said main spring, a lever conjoining one end of the main spring and that part of the vehicle to which said end is ordinarily attached and a double set of connections for alternately engaging opposite extremities of said supplemental springs with the said lever and with one of the relatively movable members of the system, whereby the said supplemental springs are systematically and increasingly flexed and the said movable member is subjected to a continually augmented restraint as the vehicle parts are moved in either direction from the normal load position.

23. In an improved suspension system for two relatively movable members the combination of a main spring secured at its median part to one of said members, a pair of auxiliary springs having their longitudinal axes disposed on opposite sides of, and inclined to, the median longitudinal axis of the main spring, a lever conjoining the end of the main spring with the other of said relatively movable members, and a double set of cross connections for alternately engaging the opposite extremities of said auxiliary springs with the lever and with one of the said movable members respectively, whereby the latter is subjected to oppositely inclined restraining pressures when the said members move in reverse directions from the position of static equilibrium.

24. In an improved suspension system for vehicles the combination of two springs one of which is a relatively stiff short range main spring, and the other of which is a relatively pliant long range supplemental spring, with a lever suspension conjoining the said springs with one of the relatively movable parts of the vehicle, and a dual set of single acting connections between the opposite ends of said supplemental spring and a vehicle support therefor, whereby the said support is subjected to a reversed stress from the long range supplemental springs when the vehicle parts are moved in either direction from normal load position.

25. An improved elastic supplemental system for vehicles which comprises the combination of a relatively stiff short range main spring of large load carrying capacity with a relatively pliant long range supplemental spring, a support for the said supplemental spring, a lever for coupling one end of said main spring with one of the relatively movable vehicle members and a double set of connections conjoining the opposite extremities of the supplemental spring with the said lever and with the said support, whereby the said conjoining parts are moved in opposite directions when the vehicle members are displaced from normal load position.

26. An improved suspension system for vehicles which comprises the combination of a main spring, a pair of double acting supplemental springs symmetrically disposed one on each side of the main spring, a support secured to the said main spring intermediate the opposite extremities thereof, a double arm lever connecting one end of the main spring with that part of the vehicle to which said end is ordinarily attached, and alternately active cross connections conjoining opposing extremities of the said supplemental springs with the ends of the said lever and with the said intermediate support respectively, whereby the conjoining elements are moved in opposite directions when the main spring is displaced from normal load position.

27. An improved suspension system for vehicles which comprises a main spring, a plurality of double acting supplemental springs, positioned on opposite sides thereof, a support clip attached to an intermediate part of said main spring and disposed between the said supplemental springs, a lever pivotally mounted on one of the relatively movable vehicle members and flexibly coupled to one end of said main spring, a dual set of alternately active connections for conjoining the opposed extremities of the supplemental springs with the said lever and the said support clip, and a pair of stop elements for locking said conjoined parts against further relative movement when the main spring has been displaced by a predetermined amount from normal load position.

28. In a suspension system for two relatively movable members the combination of a lever flexibly conjoining the said members, a spring supported on one member with its axis adjacent, and inclined, to the chord of arcuate motion of one end of said lever and also inclined to the direction of relative movement of the said member, and a dual set of alternately engaged connections between the said lever end and the opposite extremities of said spring, whereby the latter is increasingly flexed when the members are displaced in either direction from the position of static equilibrium and the points of alternate connective engagement between the lever-spring elements are maintained in substantial alignment with the axis of the said spring.

29. An elastic suspension system for vehicles the combination of a main spring, an auxiliary spring supported on one of the relatively movable vehicle members with its axis inclined to the line of oscillation of the said member, and means conjoining the said springs with the said movable members whereby the auxiliary resilient element is increasingly flexed in the direction of its axis, without any substantial lateral bending or displacement thereof with respect to its support when the parts of the system are displaced from normal load position.

30. A shock absorber organization for vehicles which comprises the combination of a main spring, a supplemental spring supported on an intermediate flexible portion of said main spring with its axis inclined thereto, and suspension means alternately conjoining opposite extremities of the supplemental spring with the end of the main spring and with one of the relatively movable vehicle members, whereby reversed displacements of the latter from normal load position will symmetrically flex the said supplemental spring on its axial line.

31. An elastic suspension system for two relatively movable members which comprises the combination of a main spring and a supplemental spring having their longitudinal axes inclined to each other, a support clip secured to the main spring at a point intermediate its ends, a pair of single acting or one way connectors between the said clip and the extremities of the said supplemental spring, a rocking lever having one end disposed in line with the axis of the supplemental spring, a second pair of connections for alternately coupling the said lever end to opposite extremities of said supplemental spring, and means conjoining other portions of the lever with the main spring and with one of the relatively movable members, whereby the interconnected ends of the lever-supplemental-spring elements are moved in substantial alignment with the supplemental spring axis and a symmetrical progressively increased stress is imposed on said spring and transmitted therethrough to the intermediate part of the main spring when the members of the system are displaced in either direction from the position of static equilibrium.

32. A shock absorber attachment for a main spring suspension, which comprises a long range auxiliary spring having its axis disposed at an angle to the main spring support, a clip member secured to the main spring, a pair of single acting connections between said clip and said auxiliary spring ends, a lever element conjoining the extremity of the main spring with an adjacent part of the suspended system and having an arc of movement whose chord is inclined to the supplemental spring axis, a second pair of single connections between the lever and the extremities of the supplemental spring, and a pair of stops for interlocking the connected lever-spring elements against further relative movement when the displacements from normal load position exceed a predetermined magnitude.

33. A shock absorber organization for two relatively movable members which comprises the combination of a double acting spring supported on one of said members, a rocking lever conjoining the two members, a pair of single acting connections for alternately engaging the lever with opposite extremities of said spring whereby the latter is increasingly flexed by relative displacements of the said members from the normal position of static equilibrium, and means for damping the return movement of the stressed parts to said normal position.

34. An elastic suspension system for vehicles which comprises the combination of a double acting spring element, a vehicle support therefor, a rocking lever element, means for conjoining the aforesaid elements whereby the said spring is increasingly flexed in opposite directions when the vehicle parts are displaced downwardly and upwardly from the normal load position, and means for damping the elastic recoil of the stressed spring whereby the period of free oscillation of the system is increased and the amplitude of said oscillation is decreased, substantially as described and for the purposes specified.

35. A shock absorber organization for two relatively movable members which comprises the combination of a long range supplemental spring supported on one of the members, a movable lever flexibly coupled to both of said members, a dual set of single acting connections between said lever and the opposite extremities of said spring, a pair of stops engaging said interconnected parts at predetermined points in their concurrent movements, and damping means associated with said parts for increasing the period and decreasing the amplitude of said movements, substantially as described.

36. A shock absorber organization for vehicles which comprises a relatively stiff short range main spring of great load carrying capacity, a plurality of relatively pliant long range auxiliary springs disposed with their axes on opposite sides of, and inclined to, the axis of the main spring, dual means for conjoining the end of the main spring with the opposite extremities of the auxiliary springs whereby the latter are increasingly flexed in the reverse direction to that in which the main spring is moved when the vehicle parts are displaced from normal load position, and means for damping the recoil of said auxiliary springs from their stressed condition.

37. In an elastic suspension for vehicles the combination of a main leaf spring, a plurality of long range auxiliary springs suspended from the main leaf spring support, and having their longitudinal axes inclined thereto, a movable lever conjoining one end of the main spring with that part of the vehicle to which said end is ordinarily attached, means for alternately engaging said lever with opposite extremities of the supplemental springs when the conjoined lever-main-spring members are moved upwardly and downwardly, a pair of stops for interlocking the engaged lever-supplemental-spring elements at predetermined points in their movement, and means for damping the return or recoil of the stressed parts from their interlocked positions.

38. In an elastic suspension for vehicles the combination of a main leaf spring supported at a median portion on one of the members of the vehicle, with a pair of supplemental - lever - actuated - spring systems symmetrically disposed on opposite sides of said support; each of the said systems comprising a movable lever conjoining one end of the said main spring with an adjacent part of the chassis frame, a double acting secondary spring, a pair of alternately active connections between said lever and opposite extremities of said secondary spring, and means for transmitting the stresses imposed on said extremities to a relatively movable part of the system, whereby said stresses directly oppose any displacement of the said part from normal load position.

39. In an elastic suspension for vehicles the combination of a main leaf spring supported at a median portion on one of the members of the vehicle, with a pair of supplemental - lever - actuated - spring systems symmetrically disposed on opposite sides of said support; each of the said systems comprising a movable lever pivotally coupled to the chassis frame, a double acting secondary spring, a set of connections conjoining said lever with one end of the main spring and with alternately engaged extremities of the secondary spring whereby the latter is increasingly flexed whenever the vehicle parts are displaced from normal load position, and means for transmitting the imposed tension of the secondary spring in an inclined direction to a relatively movable body member, whereby the latter is elastically restrained from both vertical oscillation and side sway.

40. In an elastic support for vehicles the combination of a main spring secured at its median part to the axle of the vehicle, with a twin pair of supplemental-lever-actuated-spring systems symmetrically disposed on opposite sides of the said main spring; each of said systems comprising a lever arm flexibly coupled at its outer end to the adjacent end of the main spring and pivotally supported at an intermediate point on a body member, a double acting secondary spring having its axis inclined to the central transverse plane of the vehicle, a pair of dual connections between said lever arms and the opposite extremities of said secondary springs whereby the said extremities are alternately moved in a direction opposite to that in which the main spring is flexed by variations in load stress, and means for transmitting the tension of the inclined secondary springs to an intermediate resilient part of the main spring whereby the latter is elastically restrained from both vertical oscillation and lateral or transverse twisting.

41. In an elastic suspension system for vehicles the combination of a main spring, with a pair of supplemental-lever actuated-spring supports symmetrically disposed at opposite ends of said main spring; each of the said supports comprising a lever conjoining that end of the main spring with the adjacent part of the vehicle frame, a pair of secondary springs disposed with their axes on opposite sides of, and inclined to, the longitudinal axis of the main spring, a dual set of alternately active connections conjoining the lever with opposite extremities of the pair of secondary springs, a second set of connections for transmitting the tension imposed on the inclined secondary springs to a relatively movable part of the system, and stops for limiting the flexural motion of the secondary spring extremities with respect to said part, whereby the latter is first elastically restrained and then mechanically locked against both vertical oscillation and side sway on its lever-spring support.

42. In a spring suspension organization for vehicles the combination of a pair of main springs disposed at opposite ends of the vehicle, with a plurality of supplemental-lever-actuated-spring systems symmetrically disposed with respect to the said main springs; each of the said systems comprising a lever, a double acting secondary spring, multiple connections conjoining the lever and the secondary spring with an adjacent end of one of said main springs whereby any displacement of the latter from normal load position will impose an increased flexure stress on said secondary spring, and means whereby the said imposed stress is transmitted in an inclined direction to one of the vertically movable parts of the organization; the said direction of stress transmission for one system being obliquely disposed to that of another symmetrized system whereby the vertically movable parts are elastically restrained against transverse or lateral movement in the plane of the oppositely inclined secondary spring tensions.

43. An elastic shock absorber organization for vehicles which consists of a complementary system of primary spring members and secondary lever-controlled-spring units symmetrically arranged with respect to the central axis of the vehicle; each of said secondary units comprising a group of double acting long range supplemental springs disposed in interbalanced relation on opposite sides of one of the main spring members, a set of suspension members alternately conjoining opposite extremities of the supplemental spring group with one portion of the associated main spring member and an adjacent portion of the vehicle frame, whereby said supplemental springs are increasingly stressed by every displacement of the system from normal load position, and means for transmitting the said stresses in an inclined direction to vertically movable parts of the organization; the lines of stress transmission in one unit being oblique to those in another symmetrically arranged unit on the opposite side of the vehicle axis, whereby the aforesaid vertically movable parts are elastically restrained against any relative horizontal displacement.

44. An elastic shock absorber organization for vehicles which consists of a complementary system of primary spring members and secondary lever-controlled-spring units symmetrically arranged with respect to the central axis of the vehicle; each of said secondary units comprising a group of double acting long range supplemental springs disposed in interbalanced relation on opposite sides of one of the main spring members, a set of suspension members alternately conjoining opposite extremities of the supplemental spring group with one portion of the associated main spring member and an adjacent portion of the vehicle frame whereby said supplemental springs are increasingly stressed by every displacement of the system from normal load position, means for transmitting the said stresses in an inclined direction to vertically movable parts of the organization, and means for damping the recoil or return movement of the stressed elements to said normal position; the action of the said transmitted stresses of one unit being opposed in direction to the action of the corresponding stresses in another symmetrically disposed unit, and the said damping actions of the different units being all exercised in coincident or parallel planes, whereby the aforesaid vertically movable parts are elastically and frictionally restrained from any relative horizontal or angular displacement and both side sway and longitudinal pitching of the vehicle body are thereby prevented.

45. A shock absorber organization for two relatively movable members which comprises a main spring, a supplemental spring cooperating therewith to elastically resist the relative approach of the said members, and a single acting check device for damping and retarding the normal expansion of the supplemental spring during the return movement of the members to the initial position of equilibrium.

46. In an elastic suspension system for vehicle bodies the combination of a plurality of springs interposed between the body and axle members, means conjoining said springs and acting to impose a concurrently increased flexure thereon when the system is subjected to compressive stress, and a one way restraint mechanism for resisting the normally free expansion movement of one of the said springs when the compressive stress is relieved.

47. A shock absorber system for vehicles which comprises a main spring, a double acting coil spring cooperating therewith to elastically resist any displacement of the vehicle members from normal load position, and damping means acting only to retard the expansion movements of the said supplemental coil spring when the members return to the said normal position.

48. In a shock absorber system for vehicles the combination of a main spring, a pair of supplemental springs symmetrically supported in balanced relationship on an intermediate flexible position thereof, means conjoining said springs with the relatively movably body and axle members of the vehicle and acting to impose concurrently increased stresses thereon when the said members are subjected to an increase in kinetic load, and means for imposing a damping resistance on the normal expansion of the said supplemental springs when the load stress is decreased.

49. In an elastic stabilizing system for vehicles the combination of a main spring interposed between the body and axle members of the vehicle, a plurality of supplemental springs supported by an intermediate flexible portion of the said main spring and symmetrically disposed in balanced relationship on the opposite sides thereof, means for concurrently increasing the elastic pressure on the said symmetrically disposed supplemental springs and thereby increasing the resistance to the torsional distortion of the said main spring when the system is subjected to compressive stresses, and damping means to retard the free expansion of the said springs and thereby restrain any rolling and pitching of the body members when the compressive stress is relieved.

In witness whereof, I have hereunto set my hand and seal at Pittsburgh, Pennsylvania, this second day of June, A. D., one thousand nine hundred and twenty.

FRANK L. O. WADSWORTH. [L. S.]